(12) United States Patent
Maenaka et al.

(10) Patent No.: US 7,039,254 B1
(45) Date of Patent: May 2, 2006

(54) IMAGE INTERPOLATING METHOD

(75) Inventors: Akihiro Maenaka, Kadoma (JP);
Masahiko Yoshiyama, Hirakata (JP);
Susumu Tanase, Kadoma (JP);
Haruhiko Murata, Takatsuki (JP)

(73) Assignee: Sanyo Electric Co., Ltd., Osaka (JP)

( * ) Notice: Subject to any disclaimer, the term of this patent is extended or adjusted under 35 U.S.C. 154(b) by 538 days.

(21) Appl. No.: 09/821,452

(22) PCT Filed: Jul. 28, 2000

(86) PCT No.: PCT/JP00/05129

§ 371 (c)(1),
(2), (4) Date: Apr. 4, 2001

(87) PCT Pub. No.: WO01/11879

PCT Pub. Date: Feb. 15, 2001

(30) Foreign Application Priority Data

| Aug. 5, 1999 | (JP) | ............................... 11-222717 |
| Aug. 27, 1999 | (JP) | ............................... 11-241520 |
| Sep. 28, 1999 | (JP) | ............................... 11-274967 |
| Mar. 28, 2000 | (JP) | ............................... 2000-089664 |

(51) Int. Cl.
*G06K 9/32* (2006.01)
*G06K 9/40* (2006.01)
*G09G 5/00* (2006.01)

(52) U.S. Cl. .................. 382/300; 382/266; 345/606
(58) Field of Classification Search ............... 345/611, 345/606; 382/300, 266, 267, 269; 348/448, 348/452, 458
See application file for complete search history.

(56) References Cited

U.S. PATENT DOCUMENTS 4,985,764 A * 1/1991 Sato ........................... 348/448

(Continued)

FOREIGN PATENT DOCUMENTS

JP 62-068366 3/1987

(Continued)

OTHER PUBLICATIONS

Haan et al., "Deinterlacing—An Overview", Proceedings of the IEEE, vol. 86, No. 9, pp. 1839-1857 (Sep. 1998).

*Primary Examiner*—Vikkram Bali
*Assistant Examiner*—Wes Tucker
(74) *Attorney, Agent, or Firm*—Arent Fox PLLC

(57) ABSTRACT

An image interpolating method for interpolating a pixel at an intermediate position between a first original pixel and a second original pixel adjacent to the first original pixel, comprising a first step of calculating an edge component for judging whether or not an interpolated pixel is positioned in the vicinity of an edge position of original image data, a second step of determining a range where pixel data on the interpolated pixel is settable on the basis of the calculated edge component and pixel data on the first and second original pixels, and a third step of selecting a plurality of sets of opposed pixels between which the interpolated pixel is sandwiched diagonally, and determining, for each of the sets, the pixel data on the interpolated pixel in a case where a correlation value represented by the sum of the absolute values of the differences between the pixel data on the interpolated pixel and pixel data on the opposed pixels is the minimum in the range where the pixel data on the interpolated pixel is settable and the minimum correlation value.

26 Claims, 20 Drawing Sheets

U.S. PATENT DOCUMENTS

| | | | |
|---|---|---|---|
| 5,093,721 A | 3/1992 | Rabii | |
| 5,410,356 A * | 4/1995 | Kikuchi et al. | 348/452 |
| 5,796,437 A | 8/1998 | Muraji et al. | |
| 5,832,143 A * | 11/1998 | Suga et al. | 382/300 |
| 5,886,745 A * | 3/1999 | Muraji et al. | 348/448 |
| 6,118,488 A * | 9/2000 | Huang | 348/452 |
| 6,192,158 B1 * | 2/2001 | Abousleman | 382/240 |
| 6,262,773 B1 * | 7/2001 | Westerman | 348/448 |
| 6,263,120 B1 * | 7/2001 | Matsuoka | 382/300 |
| 2003/0185464 A1 * | 10/2003 | Maenaka et al. | 382/300 |

FOREIGN PATENT DOCUMENTS

| | | |
|---|---|---|
| JP | 63-187785 | 8/1988 |
| JP | 05-207271 | 8/1993 |
| JP | 05-233794 | 9/1993 |
| JP | 05-284338 | 10/1993 |
| JP | 08-305843 | 11/1996 |
| JP | 09037214 A | 2/1997 |
| JP | 11041565 A | 2/1999 |
| JP | 11146346 A | 5/1999 |

* cited by examiner

(12)  United States Patent  US 7,039,254 B1

IMAGE INTERPOLATING METHOD

TECHNICAL FIELD

The present invention relates to an image interpolating method for interpolating an image.

BACKGROUND ART

Conventionally in cases such as a case where an interlace image is converted into a progressive image, a case where an image is enlarged, and a case where the resolution of an image is enhanced, various methods of interpolating an image have been proposed using pixel data on adjacent original pixels (corresponding to the amount of data representing luminance on a display).

Typical examples of an image interpolating method are a simple interpolating method and a linear interpolating method. The simple interpolating method is a method of giving pixel data on either one of pixels adjacent to a pixel to be interpolated on the upper and lower sides (or on the right and left sides) to the pixel to be interpolated as pixel data. The linear interpolating method is a method of giving the average of pixel data on pixels adjacent to a pixel to be interpolated on the upper and lower sides (on the right and left sides) to the pixel to be interpolated as pixel data.

In the simple interpolating method, however, the pixel data on the pixel adjacent to the pixel to be interpolated is given as it is. When there is a diagonal edge portion in an image reproduced on a display or the like, backlash occurs in the edge portion. On the other hand, in the linear interpolating method, the average of the pixel data on the pixels adjacent to the pixel to be interpolated on the upper and lower sides (on the right and left sides) is given. Accordingly, the vicinity of the pixel to be interpolated is an edge portion. When the difference between the pixel data on the pixels adjacent to the pixel to be interpolated on the upper and lower sides (on the right and left sides) is large, the interpolated pixel takes an intermediate value, so that the edge portion is blurred.

The present invention provides an image interpolating method capable of preventing backlash and blur from occurring in an edge portion in interpolating an image as well as capable of reproducing a smooth image.

DISCLOSURE OF INVENTION

[1] Description of First Image Interpolating Method According to Present Invention In an image interpolating method for interpolating a pixel at an intermediate position between a first original pixel and a second original pixel adjacent to the first original pixel, a first image interpolating method according to the present invention is characterized by comprising a first step of calculating an edge component for judging whether or not an interpolated pixel exists in the vicinity of an edge position of original image data; a second step of finding a range where pixel data on the interpolated pixel is settable on the basis of the calculated edge component and pixel data on the first and second original pixels; a third step of selecting a plurality of sets of opposed pixels between which the interpolated pixel is sandwiched diagonally, and finding, for each of the sets, the pixel data on the interpolated pixel in a case where a correlation value represented by the sum of the absolute values of the differences between the pixel data on the interpolated pixel and pixel data on the opposed pixels is the minimum in the range where the pixel data on the interpolated pixel is settable and the minimum correlation value; and a fourth step of finding the pixel data on the interpolated pixel on the basis of the pixel data on the interpolated pixel in the case where the correlation value is the minimum and the minimum correlation value which are found for each of the sets.

When an original pixel adjacent to the first original pixel and opposite to the second original pixel is taken as a third original pixel, and an original pixel adjacent to the second original pixel and opposite to the first original pixel is taken as a fourth original pixel, the edge component is calculated on the basis of pixel data on the first to fourth original pixels at the first step.

More specifically, letting d1 be the pixel data on the first original pixel, d2 be the pixel data on the second original pixel, d3 be the pixel data on the third original pixel, and d4 be the pixel data on the fourth original pixel, an edge component E is calculated on the basis of the following equation (1):

$$E = -d3 + d1 + d2 - d4 \quad (1)$$

Letting E be the edge component found at the first step, Th be a predetermined threshold, $d_{max}$ be the larger one of the pixel data on the first original pixel and the pixel data on the second original pixel, $d_{min}$ be the smaller one of them, and d be $d_{max} - d_{min}$, a range S where the pixel data on the interpolated pixel is settable is found on the basis of the following expression (2) at the second step:

$$\text{if } E > Th, \text{ then } d_{min} + d/2 \leq S \leq d_{max},$$

$$\text{if } -Th \leq E \leq Th, \text{ then } d_{min} + d/4 \leq S \leq d_{max} - d/4, \text{ and}$$

$$\text{if } E < -Th, \text{ then } d_{min} \leq S \leq d_{min} + d/2 \quad (2)$$

Letting x be the pixel data in the settable range S found at the second step, and da and db be respectively the pixel data on the two original pixels composing one set of opposed pixels, a correlation value L corresponding to the set is calculated by the following equation (3):

$$L = |da - x| + |db - x| \quad (3)$$

Used as the fourth step is one comprising the steps of selecting the minimum of the minimum correlation values found for the sets at the third step, extracting the pixel data on the interpolated pixel in a case where the selected minimum of the minimum correlation values is given, determining, when the number of minimums of the minimum correlation values is one, the pixel data on the interpolated pixel in a case where the minimum of the minimum correlation values is given as the pixel data on the interpolated pixel, and determining, when there are a plurality of minimums of the minimum correlation values, the average of the pixel data on the interpolated pixel in a case where the minimums of the minimum correlation values are respectively given as the pixel data on the interpolated pixel.

Used as the fourth step is one comprising the steps of selecting the minimum of the minimum correlation values found for the sets at the third step, extracting the pixel data on the interpolated pixel in a case where the selected minimum of the minimum correlation values is given, determining, when the number of minimums of the minimum correlation values is one, the pixel data on the interpolated pixel in a case where the minimum of the minimum correlation values is given as the pixel data on the interpolated pixel, and extracting, when there are a plurality of minimums of the minimum correlation values, the maximum and the minimum of the pixel data on the interpolated pixel in a case where the minimums of the minimum correlation values are respectively given, and determining the average of the extracted maximum and minimum as the pixel data on the interpolated pixel.

Used as the fourth step is one comprising the steps of selecting the minimum of the minimum correlation values found for the sets at the third step, extracting the pixel data on the interpolated pixel in a case where the selected minimum of the minimum correlation values is given, determining, when the number of minimums of the minimum correlation values is one, the pixel data on the interpolated pixel in a case where the minimum of the minimum correlation values is given as the pixel data on the interpolated pixel, and selecting, when there are a plurality of minimums of the minimum correlation values, the pixel data obtained from opposed pixels in closest proximity to the interpolated pixel out of the pixel data on the interpolated pixel in a case where the minimums of the minimum correlation values are respectively given, and determining, when the number of the selected pixel data is one, the pixel data as the pixel data on the interpolated pixel, while determining, when the number of the selected pixel data is two, the average of the pixel data as the pixel data on the interpolated pixel.

[2] Description of Second Image Interpolating Method According to Present Invention In an image interpolating method for interpolating a pixel at an intermediate position between a first original pixel and a second original pixel adjacent to the first original pixel, a second image interpolating method according to the present invention is characterized by comprising a first step of calculating an edge component for judging whether or not an interpolated pixel exists in the vicinity of an edge position of original image data; a second step of correcting the calculated edge component on the basis of a predetermined pseudo noise component; a third step of finding a range where pixel data on the interpolated pixel is settable on the basis of an edge component after the correction and pixel data on the first and second original pixels; a fourth step of selecting a plurality of sets of opposed pixels between which the interpolated pixel is sandwiched diagonally, and finding, for each of the sets, the pixel data on the interpolated pixel in a case where a correlation value represented by the sum of the absolute values of the differences between the pixel data on the interpolated pixel and pixel data on original pixels in the vicinity of the opposed pixels is the minimum in the range where the pixel data on the interpolated pixel is settable and the minimum correlation value; and a fifth step of finding the pixel data on the interpolated pixel on the basis of the pixel data on the interpolated pixel in the case where the correlation value is the minimum and the minimum correlation value which are found for each of the sets.

When an original pixel adjacent to the first original pixel and opposite to the second original pixel is taken as a third original pixel, and an original pixel adjacent to the second original pixel and opposite to the first original pixel is taken as a fourth original pixel, the edge component is calculated on the basis of pixel data on the first to fourth original pixels at the first step.

More specifically, letting d1 be the pixel data on the first original pixel, d2 be the pixel data on the second original pixel; d3 be the pixel data on the third original pixel, and d4 be the pixel data on the fourth original pixel, an edge component E is calculated on the basis of the following equation (4):

$$E = -d3 + d1 + d2 - d4 \quad (4)$$

Letting Q be a pseudo noise component, and E be the edge component calculated at the first step, an edge component E1 after the correction found at the second step is given by the following expression (5):

if $-Q \leq E \leq Q$, then E1=0, and if $E>Q$ or $E<-Q$, then E1=E  (5)

Letting E1 be the edge component after the correction found at the second step, $d_{max}$ be the larger one of the pixel data on the first original pixel and the pixel data on the second original pixel, $d_{min}$ be the smaller one of them, dc be the average of $d_{max}$ and $d_{min}$, and $\alpha(0 \leq \alpha \leq 1)$ and $\gamma$ be previously set factors, a range S where the pixel data on the interpolated pixel is settable is found on the basis of the following expression (6) at the third step:

if $E1 \leq 0$ then $d_{min} \cdot \alpha + dc(1-\alpha) \leq S \leq d_{max} \cdot \alpha + dc(1-\alpha) + E1 \cdot \gamma$, and if $E1 < 0$ then $d_{min} + \alpha + dc(1-\alpha) + E1 \cdot \gamma \leq S \leq d_{max} \cdot \alpha + dc(1-\alpha)$  (6)

When a direction connecting the first original pixel and the second original pixel is defined as a vertical direction, a direction perpendicular to the vertical direction is defined as a right-and-left direction, a set of opposed pixels is taken as D12 and D24, two original pixels adjacent to the one opposed pixel D12 on the right and left sides are taken as D11 and D13, two original pixels adjacent to the opposed pixel D12 on the upper and lower sides are taken as D02 and D22, two original pixels adjacent to the other opposed pixel D24 on the right and left sides are taken as D23 and D25, two original pixels adjacent to the opposed pixel D24 on the upper and lower sides are taken as D14 and D34, pixel data on the original pixels D02, D1, D12, D13, D14, D22, D23, D24, D25, and D34 are respectively taken as d02, d11, d12, d13, d14, d22, d23, d24, d25, and d34, β1 and β2 are taken as predetermined factors, and the pixel data in the settable range S found at the third step is taken as x, an equation for calculating the correlation value L corresponding to the set is expressed by the following equations (7):

$L = |d12-x| + |d24-x\beta| + \beta1 \cdot H1 = \beta2 - V1$ $H1 = MAX\{(|d11-d12|+|d_{12}\_d13|), (|d23-d24|+|d24-d25|)\}$ $V1 = MIN\{(|d02-d12|+|d12-d22|), (|d14-d24|+|d24-d34|)\}$  (7)

Used as the fifth step is one comprising the steps of selecting the minimum of the minimum correlation values found for the sets at the fourth step, extracting the pixel data on the interpolated pixel in a case where the selected minimum of the minimum correlation values is given, determining, when the number of minimums of the minimum correlation values is one, the pixel data on the interpolated pixel in a case where the minimum of the minimum correlation values is given as the pixel data on the interpolated pixel, and determining, when there are a plurality of minimums of the minimum correlation values, the average of the pixel data on the interpolated pixel in a case where the minimums of the minimum correlation values are respectively given as the pixel data on the interpolated pixel.

Used as the fifth step is one comprising the steps of selecting the minimum of the minimum correlation values found for the sets at the fourth step, extracting the pixel data on the interpolated pixel in a case where the selected minimum of the minimum correlation values is given, determining, when the number of minimums of the minimum correlation values is one, the pixel data on the interpolated pixel in a case where the minimum of the minimum correlation values is given as the pixel data on the interpolated pixel, and extracting, when there are a plurality of minimums of the minimum correlation values, the maximum and the minimum of the pixel data on the interpolated pixel in a case where the minimums of the minimum correlation values are respectively given, and determining the average of the extracted maximum and minimum as the pixel data on the interpolated pixel.

Used as the fifth step is one comprising the steps of selecting the minimum of the minimum correlation values found for the sets at the fourth step, extracting the pixel data on the interpolated pixel in a case where the selected minimum of the minimum correlation values is given, determining, when the number of minimums of the minimum correlation values is one, the pixel data on the interpolated pixel in a case where the minimum of the minimum correlation values is given as the pixel data on the interpolated pixel, and selecting, when there are a plurality of minimums of the minimum correlation values, the pixel data obtained from opposed pixels in closest proximity to the interpolated pixel out of the pixel data on the interpolated pixel in a case where the minimums of the minimum correlation values are respectively given, and determining, when the number of the selected pixel data is one, the pixel data as the pixel data on the interpolated pixel, while determining, when the number of the selected pixel data is two, the average of the pixel data as the pixel data on the interpolated pixel.

[3] Description of Third Image Interpolating Method According to Present Invention In an image interpolating method for interpolating a pixel at a central position among four original pixels comprising a first original pixel and a second original pixel which are adjacent to each other on the right and left sides, a third pixel adjacent to the first original pixel on the lower side, and a fourth pixel adjacent to the second original pixel on the lower side, a third image interpolating method according to the present invention is characterized by comprising a first step of calculating a first edge component for judging whether or not an interpolated pixel exists in the vicinity of an edge position of original image data on the basis of pixel data on the first original pixel, the fourth original pixel, a fifth original pixel on an extension of a line connecting the first original pixel and the fourth original pixel and adjacent to the first original pixel diagonally to the upper left, and a sixth original pixel on the extension of the line connecting the first original pixel and the fourth original pixel and adjacent to the fourth original pixel diagonally to the lower right; a second step of calculating a second edge component for judging whether or not the interpolated pixel exists in the vicinity of the edge position of the original image data on the basis of pixel data on the second original pixel, the third original pixel, a seventh original pixel on an extension of a line connecting the second original pixel and the third original pixel and adjacent to the second original pixel diagonally to the upper right, and an eighth original pixel on the extension of the line connecting the second original pixel and the third original pixel and adjacent to the third original pixel diagonally to the lower left; a third step of finding a first range where pixel data on the interpolated pixel is settable on the basis of the first edge component and the pixel data on the first and fourth original pixels and a second range where the pixel data on the interpolated pixel is settable on the basis of the second edge component and the pixel data on the second and third original pixels; a fourth step of judging whether or not portions which are overlapped with each other exist in the first settable range and the second settable range; a fifth step of calculating, when there exist no portions which are overlapped with each other in the first settable range and the second settable range, the average of the pixel data on the first to fourth original pixels, and determining the result of the calculation as the pixel data on the interpolated pixel; a sixth step of setting, when there exist portions which are overlapped with each other in the first settable range and the second settable range, the overlapped portions as a settable range, then selecting a plurality of sets of opposed pixels between which the interpolated pixel is sandwiched diagonally, and finding, for each of the sets, the pixel data on the interpolated pixel in a case where a correlation value represented by the sum of the absolute values of the differences between the pixel data on the interpolated pixel and pixel data on the opposed pixels is the minimum in the range where the pixel data on the interpolated pixel is settable and the minimum correlation value; and a seventh step of finding the pixel data on the interpolated pixel on the basis of the pixel data on the interpolated pixel in the case where the correlation value is the minimum and the minimum correlation value which are found for each of the sets at the sixth step.

Letting d1 be the pixel data on the first original pixel, d4 be the pixel data on the fourth original pixel, d5 be the pixel data on the fifth original pixel, d6 be the pixel data on the sixth original pixel, and EL be a first edge component, the first edge component EL is calculated on the basis of the following equation (8) at the first step. Further, letting d2 be the pixel data on the second original pixel, d3 be the pixel data on the third original pixel, d7 be the pixel data on the seventh original pixel, d8 be the pixel data on the eighth original pixel, and ER be a second edge component, the second edge component ER is calculated on the basis of the following equation (9) at the second step.

$$EL = -d5 + d1 + d4 - d6. \quad (8)$$

$$ER = -d7 + d2 + d3 - d8. \quad (9)$$

Letting EL be the first edge component, ER be the second edge component, Th be a predetermined threshold, $dL_{max}$ be the larger one of the pixel data on the first original pixel and the pixel data on the fourth original pixel, $dL_{min}$ be the smaller one of them, dL be $dL_{max} - dL_{min}$, $dR_{max}$ be the larger one of the pixel data on the second original pixel and the pixel data on the third original pixel, $dR_{min}$ be the smaller one of them, and dR be $dR_{max} - dR_{min}$, a first settable range SL and a second settable range SR are respectively found on the basis of the following expressions (10) and (11) at the third step:

if $EL > Th$, then $dL_{min} + dL/2 \leq SL \leq dL_{max}$, if $-Th \leq EL \leq Th$, then $dL_{min} + dL/4 \leq SL \leq dL_{max} - dL/4$, and if $EL < -Th$, then $dL_{min} \leq SL \leq d_{Lmin} + dL/2$ \quad (10)

if $ER > Th$, then $dR_{min} + dR/2 < SR < dR_{max}$, if $-Th \leq ER \leq Th$, then $dR_{min}+dR/4 \leq SR \leq dR_{max}-dR/4$, and if $ER<-Th$, then $dR_{min} \leq SR \leq dR_{min}+dR/2$ (11)

Letting x be the pixel data in the settable range S set at the sixth step, and da and db be respectively the pixel data on the two original pixels composing one set of opposed pixels, a correlation value L corresponding to the set is calculated by the following equation (12):

$$L=|da-x|+|db-x|$$ (12)

Used as the seventh step is one comprising the steps of selecting the minimum of the minimum correlation values found for the sets at the sixth step, extracting the pixel data on the interpolated pixel in a case where the selected minimum of the minimum correlation values is given, determining, when the number of minimums of the minimum correlation values is one, the pixel data on the interpolated pixel in a case where the minimum of the minimum correlation values is given as the pixel data on the interpolated pixel, and determining, when there are a plurality of minimums of the minimum correlation values, the average of the pixel data on the interpolated pixel in a case where the minimums of the minimum correlation values are respectively given as the pixel data on the interpolated pixel.

Used as the seventh step is one comprising the steps of selecting the minimum of the minimum correlation values found for the sets at the sixth step, extracting the pixel data on the interpolated pixel in a case where the selected minimum of the minimum correlation values is given, determining, when the number of minimums of the minimum correlation values is one, the pixel data on the interpolated pixel in a case where the minimum of the minimum correlation values is given as the pixel data on the interpolated pixel, and extracting, when there are a plurality of minimums of the minimum correlation values, the maximum and the minimum of the pixel data on the interpolated pixel in a case where the minimums of the minimum correlation values are respectively given, and determining the average of the extracted maximum and minimum as the pixel data on the interpolated pixel.

Used as the seventh step is one comprising the steps of selecting the minimum of the minimum correlation values found for the sets at the sixth step, extracting the pixel data on the interpolated pixel in a case where the selected minimum of the minimum correlation values is given, determining, when the number of minimums of the minimum correlation values is one, the pixel data on the interpolated pixel in a case where the minimum of the minimum correlation values is given as the pixel data on the interpolated pixel, and selecting, when there are a plurality of minimums of the minimum correlation values, the pixel data obtained from opposed pixels in closest proximity to the interpolated pixel out of the pixel data on the interpolated pixel in a case where the minimums of the minimum correlation values are respectively given, and determining, when the number of the selected pixel data is one, the pixel data as the pixel data on the interpolated pixel, while determining, when the number of the selected pixel data is two, the average of the pixel data as the pixel data on the interpolated pixel.

[4] Description of Fourth Image Interpolating Method According to Present Invention In an image interpolating method for interpolating a pixel at a central position among four original pixels comprising a first original pixel and a second original pixel which are adjacent to each other on the right and left sides, a third pixel adjacent to the first original pixel on the lower side, and a fourth pixel adjacent to the second original pixel on the lower side, a fourth image interpolating method according to the present invention is characterized by comprising a first step of calculating a first edge component for judging whether or not an interpolated pixel exists in the vicinity of an edge position of original image data on the basis of pixel data on the first original pixel, the fourth original pixel, a fifth original pixel on an extension of a line connecting the first original pixel and the fourth original pixel and adjacent to the first original pixel diagonally to the upper left, and a sixth original pixel on the extension of the line connecting the first original pixel and the fourth original pixel and adjacent to the fourth original diagonally to the lower right; a second step of calculating a second edge component for judging whether or not the interpolated pixel exists in the vicinity of the edge position of the original image data on the basis of pixel data on the second original pixel, the third original pixel, a seventh original pixel on an extension of a line connecting the second original pixel and the third original pixel and adjacent to the second original pixel diagonally to the upper right, and an eighth original pixel on the extension of the line connecting the second original pixel and the third original pixel and adjacent to the third original pixel diagonally to the lower left; a third step of respectively correcting the calculated first and second edge components on the basis of predetermined pseudo noise components; a fourth step of finding a first range where pixel data on the interpolated pixel is settable on the basis of a first edge component after the correction and the pixel data on the first and fourth original pixels and a second range where the pixel data on the interpolated pixel is settable on the basis of a second edge component after the correction and the pixel data on the second and third original pixels; a fifth step of judging whether or not portions which are overlapped with each other exist in the first settable range and the second settable range; a sixth step of calculating, when there exist no portions which are overlapped with each other in the first settable range and the second settable range, the average of the pixel data on the first to fourth original pixels, and determining the result of the calculation as the pixel data on the interpolated pixel; a seventh step of setting, when there exist portions which are overlapped with each other in the first settable range and the second settable range, the overlapped portions as a settable range, then selecting a plurality of sets of opposed pixels between which the interpolated pixel is sandwiched diagonally, and finding, for each of the sets, the pixel data on the interpolated pixel in a case where a correlation value represented by the sum of the absolute values of the differences between the pixel data on the interpolated pixel and pixel data on the opposed pixels and pixel data on original pixels in the vicinity of the opposed pixels is the minimum in the range where the pixel data on the interpolated pixel is settable and the minimum correlation value; and an eighth step of finding the pixel data on the interpolated pixel on the basis of the pixel data on the interpolated pixel in the case where the correlation value is the minimum and the minimum correlation value which are found for each of the sets.

Letting d1 be the pixel data on the first original pixel, d4 be the pixel data on the fourth original pixel, d5 be the pixel data on the fifth original pixel, and d6 be the pixel data on the sixth original pixel, and EL be a first edge component, the first edge component EL is calculated on the basis of the following equation (13) at the first step. Further, letting d2 be the pixel data on the second original pixel, d3 be the pixel data on the third original pixel, d7 be the pixel data on the seventh original pixel, and d8 be the pixel data on the eighth original pixel, and ER be a second edge component, the second edge component ER is calculated on the basis of the following equation (14) at the second step:

$$EL = -d5 + d1 + d4 - d6 \quad (13)$$

$$ER = -d7 + d2 + d3 - d8 \quad (14)$$

Letting Q be a pseudo noise component, EL be the first edge component, and ER be the second edge component, a first edge component EL1 after the correction and a second edge component ER1 after the correction which are found at the third step are respectively given by the following expressions (15) and (16)

if $-Q \leq EL \leq Q$, then $EL1 = 0$, and if $EL > Q$ or $EL < -Q$, then $EL1 = EL$ \quad (15)

if $-Q \leq ER \leq Q$, then $ER1 = 0$, and if $ER > Q$ or $ER < -Q$, then $ER1 = ER$ \quad (16)

Letting EL1 be the first edge component after the correction, ER1 be the second edge component after the correction, $dL_{max}$ be the larger one of the pixel data on the first original pixel and the pixel data on the fourth original pixel, $dL_{min}$ be the smaller one of them, dLc be the average of $dL_{max}$ and $dL_{min}$, $dR_{max}$ be the larger one of the pixel data on the second original pixel and the pixel data on the third original pixel, $dR_{min}$ be the smaller one of them, dRc be the average of $dR_{max}$ and $dR_{min}$, and $\alpha$ and $\gamma$ be previously set factors, a first settable range SL and a second settable range SR are respectively found on the basis of the following expressions (17) and (18) at the fourth step:

if $EL1 \geq 0$, then $dL_{min} \cdot \alpha + dLc(1-\alpha) \leq SL \leq dL_{max} \cdot \alpha + dLc(1-\alpha) + EL1 \cdot \gamma$, and if $EL1 < 0$, then $dL_{min} \cdot \alpha + dLc(1-\alpha) + EL1 \cdot \gamma \leq SL \leq dL_{max} \cdot \alpha + dLc(1-\alpha)$ \quad (17)

if $EL1 \geq 0$, then $dR_{min} \cdot \alpha + dRc(1-\alpha) \leq SR \leq dR_{max} \cdot \alpha + dRc(1-\alpha) + ER1 \cdot \gamma$, and if $EL1 < 0$, then $dR_{min} \cdot \alpha + dRc(1-\alpha) + ER1 \cdot \gamma \leq SR \leq dR_{max} \cdot \alpha + dRc(1-\alpha)$ \quad (18)

Letting x be the pixel data in the settable range S set at the seventh step, and da and db be respectively the pixel data on the two original pixels composing one set of opposed pixels, a correlation value L corresponding to the set is calculated by the following equation (19):

$$L = |da - x| + |db - x| \quad (19)$$

Used as the eighth step is one comprising the steps of selecting the minimum of the minimum correlation values found for the sets at the seventh step, extracting the pixel data on the interpolated pixel in a case where the selected minimum of the minimum correlation values is given, determining, when the number of minimums of the minimum correlation values is one, the pixel data on the interpolated pixel in a case where the minimum of the minimum correlation values is given as the pixel data on the interpolated pixel, and determining, when there are a plurality of minimums of the minimum correlation values, the average of the pixel data on the interpolated pixel in a case where the minimums of the minimum correlation values are respectively given as the pixel data on the interpolated pixel.

Used as the eighth step is one comprising the steps of selecting the minimum of the minimum correlation values found for the sets at the seventh step, extracting the pixel data on the interpolated pixel in a case where the selected minimum of the minimum correlation values is given, determining, when the number of minimums of the minimum correlation values is one, the pixel data on the interpolated pixel in a case where the minimum of the minimum correlation values is given as the pixel data on the interpolated pixel, and extracting, when there are a plurality of minimums of the minimum correlation values, the maximum and the minimum of the pixel data on the interpolated pixel in a case where the minimums of the minimum correlation values are respectively given, and determining the average of the extracted maximum and minimum as the pixel data on the interpolated pixel.

Used as the eighth step is one comprising the steps of selecting the minimum of the minimum correlation values found for the sets at the seventh step, extracting the pixel data on the interpolated pixel in a case where the selected minimum of the minimum correlation values is given, determining, when the number of minimums of the minimum correlation values is one, the pixel data on the interpolated pixel in a case where the minimum of the minimum correlation values is given as the pixel data on the interpolated pixel, and selecting, when there are a plurality of minimums of the minimum correlation values, the pixel data obtained from opposed pixels in closest proximity to the interpolated pixel out of the pixel data on the interpolated pixel in a case where the minimums of the minimum correlation values are respectively given, and determining, when the number of the selected pixel data is one, the pixel data as the pixel data on the interpolated pixel, while determining, when the number of the selected pixel data is two, the average of the pixel data as the pixel data on the interpolated pixel.

BEST MODE FOR CARRYING OUT THE INVENTION

Figure 1:
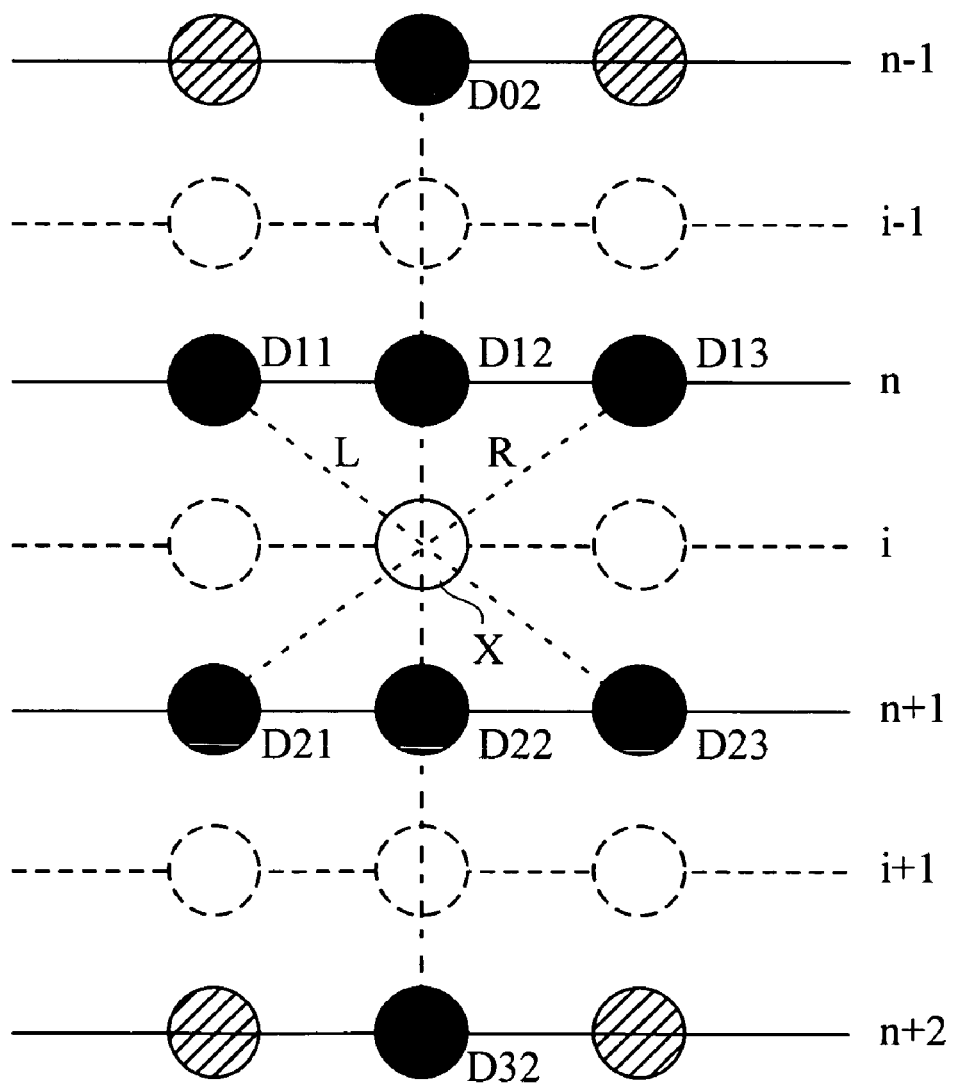
FIG. 1 is a schematic view showing the relationship between original pixels and an interpolated pixel.

Referring now to the drawings, embodiments of the present invention will be described.

[1] Description of First Image Interpolating Method

Referring now to FIGS. 1 to 6, the outline of a first image interpolating method will be described. A two-dimensional image has a two-dimensional expanse in the horizontal direction and the vertical direction. In the schematic description of the first image interpolating method described below, however, a method of one-dimensional interpolation in the vertical direction will be described in order to simplify the description.

FIG. 1 illustrates the relationship between original pixels and a pixel to be interpolated.

In FIG. 1, lines (n−1), n, (n+1), and (n+2) are horizontal lines in an original image, and lines (i−1), i, and (i+1) are horizontal lines to be interpolated.

Description is now made of a case where a pixel (hereinafter referred to as an interpolated pixel) X on the line i is interpolated. Let D12 be an original pixel just above the interpolated pixel X, and D22 be an original pixel just below the interpolated pixel X. Let D11 and D13 be respectively original pixels adjacent to the original pixel D12. Let D21 and D23 be respectively original pixels adjacent to the original pixel D22. Further, let D02 be an original pixel just above the original pixel D12, and D32 be an original pixel just below the original pixel D22.

In the following description, pixel data on the original pixels D11, D12, D13, D21, D22, D23, D02, and D32 and the interpolated pixel X are respectively denoted by d11, d12, d13, d21, d22, d23, d02, and d32 and x. In this example, the pixel data shall be composed of eight bits, black data shall be "0", and white data shall be "255".

Figure 2:
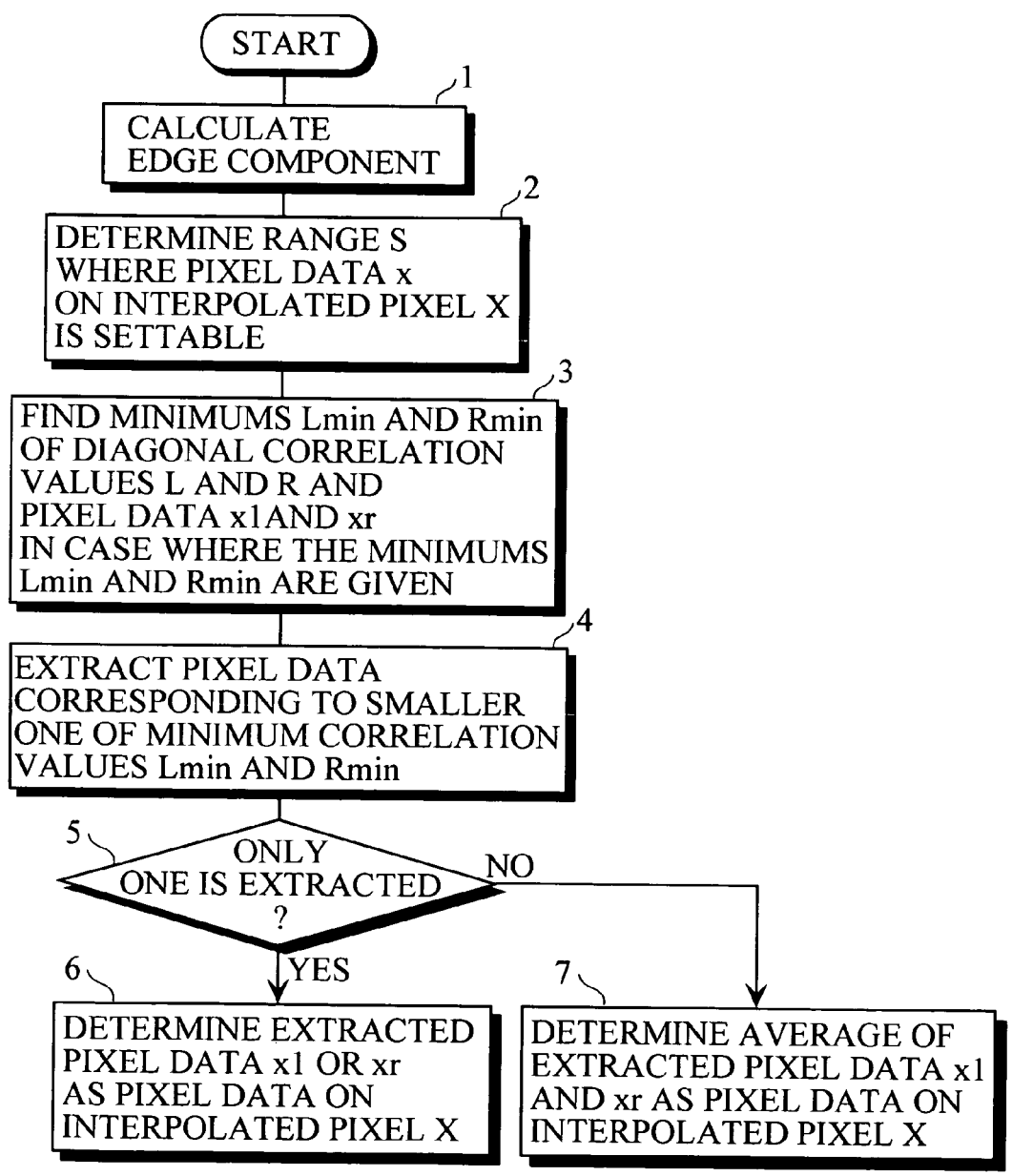
FIG. 2 is a flow chart showing the procedure for a first image interpolating method.

FIG. 2 shows the procedure for finding the pixel data x on the interpolated pixel X by the first image interpolating method.

First, an edge component E is calculated in order to judge whether or not the interpolated pixel X exists in the vicinity of an edge of an original image (step 1). That is, the edge component E is found from the following equation (20) using the pixel data on the two original pixels D02 and D12 just above the interpolated pixel X and the original pixels D22 and D23 just below the interpolated pixel X:

$$E = -d02 + d12 + d22 - d32 \quad (20)$$

When the interpolated pixel X exists in the vicinity of a black edge of the original image, the edge component E takes a relatively large negative value. When the interpolated pixel X exists in the vicinity of a white edge of the original image, the edge component E takes a relatively large positive value.

Figure 3:
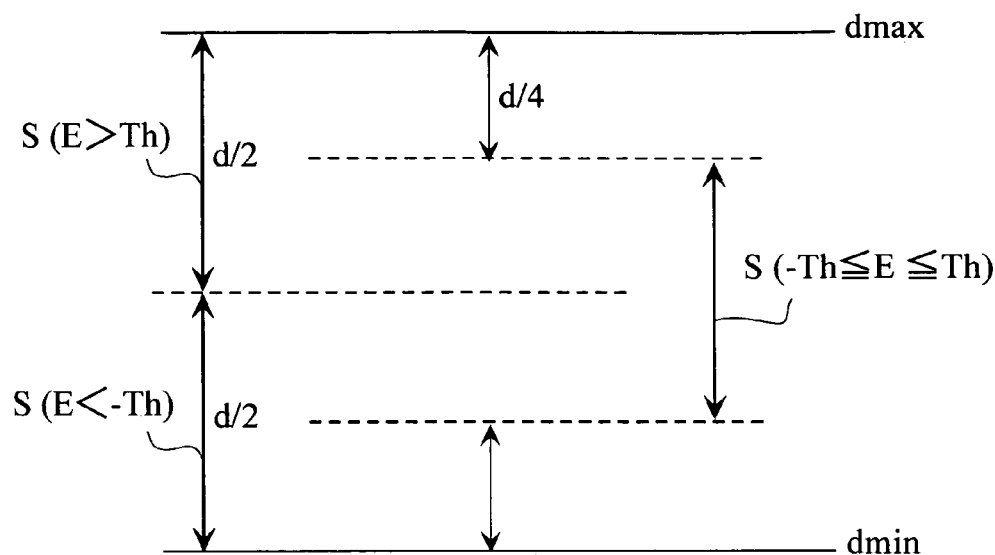
FIG. 3 is a graph of an edge component E against a range S where pixel data x on an interpolated pixel X is settable.

A range where the pixel data x on the interpolated pixel X is settable is then determined (step 2) That is, the range where the pixel data x on the interpolated pixel X is settable is determined, as shown in FIG. 3, on the basis of the edge component E found at the step 1. In FIG. 3, $d_{max}$ denotes the larger one of the pixel data d12 and d22 on the original pixels D12 and D22, and $d_{min}$ denotes the smaller one of the pixel data d12 and d22 on the original pixels D12 and D22, d denotes the difference ($d_{max}-d_{min}$) between the pixel data d12 and d22 on the original pixels D12 and D22.

Letting Th be a previously set threshold, the relationship between the edge component E and the range where the pixel data x on the interpolated pixel X is settable is as follows:

the range S where the pixel data x on the interpolated pixel X is settable when E>Th $$d_{min}+(d/2) \leq S \leq d_{max}$$

In this case, it is presumed that the interpolated pixel X exists in the vicinity of the white edge of the original image, and the settable range S is set to a range near $d_{max}$ in the range of $d_{min}$ to $d_{max}$.

the range S where the pixel data x on the interpolated pixel X is settable when −Th≦E≦Th $$d_{min}+(d/4) \leq S \leq -d_{max}-(d/4)$$

the range S where the pixel data x on the interpolated pixel X is settable when E<−Th $$d_{min} \leq S \leq -d_{min}+(d/2)$$

In this case, it is presumed that the interpolated pixel X exists in the vicinity of the black edge of the original image, and the settable range S is set to a range near $d_{max}$ in the range of $d_{min}$ to $d_{max}$.

Candidates for the pixel data on the interpolated pixel X are then found from the range S where the pixel data x on the interpolated pixel X is settable on the basis of pixel data on opposed pixels between which the interpolated pixel X is sandwiched diagonally (step 3). That is, the respective minimums $L_{min}$ and $R_{min}$ of two diagonal correlation values L and R and pixel data xl and xr in a case where the minimums are respectively given are found from the range S where the pixel data x on the interpolated pixel X is settable, as described below.

There are two methods of finding the candidates for the pixel data on the interpolated pixel X. The methods will be described.

(1) Description of First Method

All pixel data x in the settable range S are respectively substituted in the following equation (21) expressing a correlation value L between the pixel data on the two opposed pixels D11 and D23 between which the interpolated pixel X is sandwiched diagonally (diagonally to the upper left.) and the pixel data on the interpolated pixel X, to find the minimum correlation value $L_{min}$ and pixel data x1 in a case where the minimum correlation value $L_{min}$ is given:

$$L = |d11-x|+|d23-x| \quad (21)$$

Similarly, all the pixel data x in the settable range S are respectively substituted in the following equation (22) expressing a correlation value R between the pixel data on the two opposed pixels D13 and D21 between which the interpolated pixel X is sandwiched diagonally (diagonally to the upper right) and the pixel data on the interpolated pixel X, to find the minimum correlation value $R_{min}$ and pixel data xr in a case where the minimum correlation value $R_{min}$ is given:

$$R=|d13-x|+|d21-x| \quad (22)$$

In such a manner, the found pixel data x1 and xr are candidates for the pixel data on the interpolated pixel X. In such a method, however, a plurality of pixel data may, in some cases, be applicable as the pixel data x1 in a case where the minimum correlation value $L_{min}$ is given. Similarly, a plurality of pixel data may, in some cases, be applicable as the pixel data xr in a case where the minimum correlation value $R_{min}$ is given.

When a plurality of pixel data are applicable as the pixel data xl in a case where the minimum correlation value $L_{min}$ is given, the average of the pixel data may be determined as the pixel data xl in the case where the minimum correlation value $L_{min}$ is given. Similarly, when a plurality of pixel data are applicable as the pixel data xr in the case where the minimum correlation value $R_{min}$ is given, the average of the pixel data may be determined as the pixel data xr in the case where the minimum correlation value $R_{min}$ is given.

(2) Description of Second Method

Figure 4:
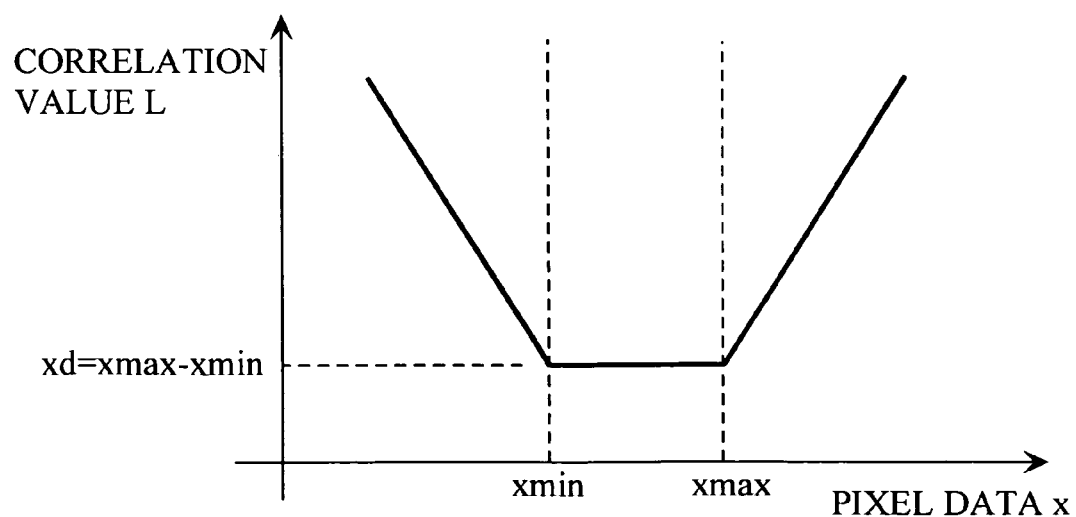
FIG. 4 is a graph of a correlation value L against pixel data x.

FIG. 4 illustrates the relationship between the correlation value L and the pixel data x. In FIG. 4, $x_{min}$ denotes the smaller one of the pixel data d11 and d23 on the opposed pixels D11 and D23, and $x_{max}$ denotes the larger one of the pixel data d11 and d23 xd denotes the difference ($x_{max}-x_{min}$) between the pixel data d11 and d23.

The foregoing equation (21) can be changed, as expressed by the following equations (23), from the relationship between the correlation value L and the pixel data x shown in FIG. 4.

$$L=xd+2(x-x_{max})(x>x_{max})$$

$$L=xd(x_{min}\leq x\leq x_{max})$$

$$L=xd+2(x_{min}-x)(x\leq x_{min}) \quad (23)$$

Although only equations for changing the correlation value L are shown, the correlation value R expressed by the foregoing equation (22) can be similarly changed.

Description is now made of a method of finding minimum correlation values $L_{min}$ and $R_{min}$ and pixel data xl and xr (a second method). Description is herein made of a method of finding the minimum correlation value $L_{min}$ and the pixel data xl.

FIGS. 5(a) to 5(f) show graphs of the correlation value L against the pixel data x and a range where the pixel data x is settable.

In FIG. 5, xa denotes the minimum of the pixel data x in the settable range, and xb denotes the maximum of the pixel data x in the settable range.

in the case of $xb \leq X_{min}$

When the range where the pixel data x is settable is not more than $x_{min}$, as shown in FIG. 5 (a), the correlation value L is the minimum in the pixel data xb. Accordingly, the minimum correlation value $L_{min}$ is $xd+2(x_{min}-xb)$. Further, the pixel data xl at this time is xb.

in the case of $x_{max} \leq xa$

When the range where the pixel data x is settable is not less than $x_{max}$, as shown in FIG. 5 (b), the correlation value L is the minimum in the pixel data xa. Consequently, the minimum correlation value $L_{min}$ is $xd+2(xa-x_{max})$. Further, the pixel data xl at this time is xa.

in the case of $x_{min} \leq xa$ and $xb \leq x_{max}$

Figure 5A:
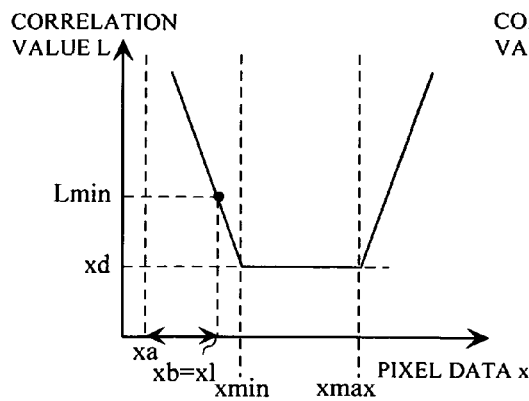
FIGS. 5(a) to 5(f) are graphs of a correlation value L against pixel data x and schematic views showing a range S where pixel data is settable.
Figure 5B:
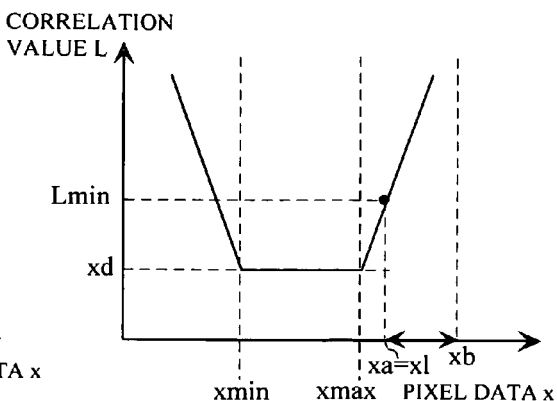
Figure 5C:
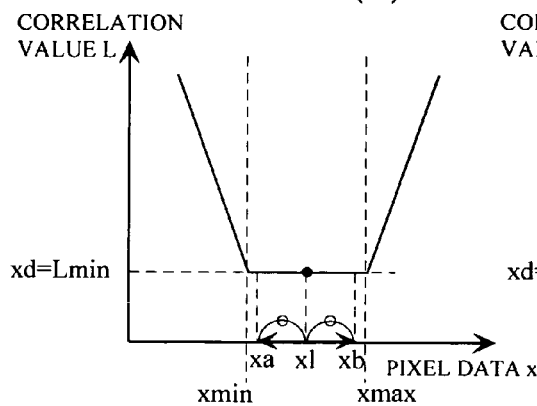

When the range where the pixel data x is settable is between the pixel data $x_{min}$ and $x_{max}$, as shown in FIG. 5(c), the correlation value L is the minimum xd in arbitrary pixel data x in the settable range. Consequently, the minimum correlation value $L_{min}$ is xd. In this case, a value $(xa+xb)/2$ at the center of the settable range is determined as the pixel data xl.

in the case of $xa<x_{min}$ and $x_{max}<xb$

Figure 5D:
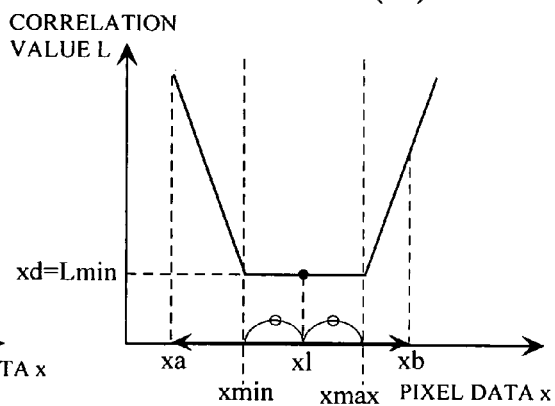

When the range where the pixel data x is settable is a range wider than the range of the pixel data $x_{min}$ to $x_{max}$, as shown in FIG. 5(d), the correlation value L is the minimum xd in arbitrary pixel data x in the range of the pixel data $x_{min}$ to $x_{max}$. Consequently, the minimum correlation value $L_{min}$ is xd. In this case, the average $(x_{min}+x_{max})/2$ of the pixel data $x_{min}$ and $x_{max}$ is determined as the pixel data xl.

in the case of $xa<x_{min}$ and $x_{min}<xb \leq x_{max}$

Figure 5E:
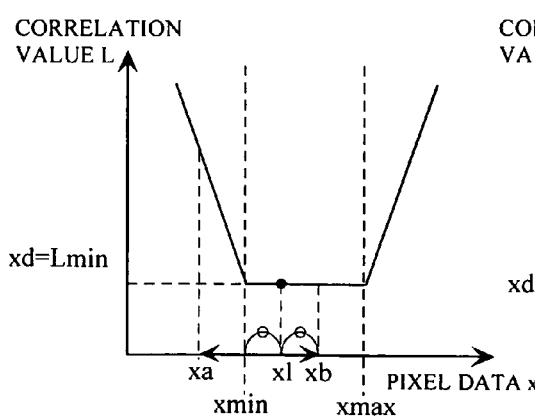

When the range where the pixel data x is settable is shifted leftward from the range of the pixel data $z_{min}$ to $x_{max}$, as shown in FIG. 5(e), the correlation value L is the minimum xd in arbitrary pixel data x in a range of the pixel data $x_{min}$ to xb. Consequently, the minimum correlation value $L_{min}$ is xd. In this case, the average $(x_{min}+xb)/2$ of the pixel data $x_{min}$ and xb is determined as the pixel data xl.

in the case of $x_{min} \leq xa<x_{max}$ and $x_{max} \leq xb$

Figure 5F:
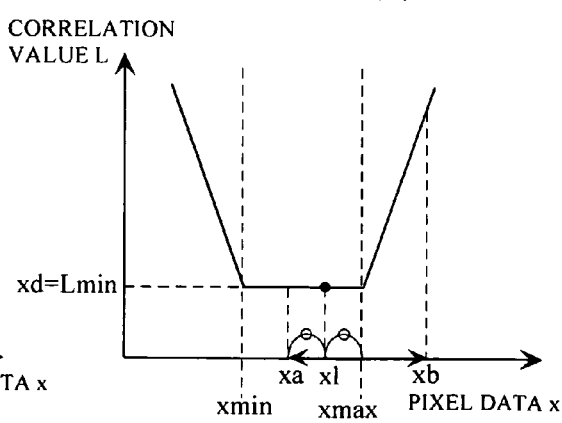

When the range where the pixel data x is settable is shifted rightward from the range of the pixel data $x_{min}$ to $x_{max}$, as shown in FIG. 5(f), the correlation value L is the minimum xd in arbitrary pixel data x in a range of the pixel data xa to $x_{max}$. Consequently, the minimum correlation value L min is xd. In this case, the average $(xa+x_{max})/2$ of the pixel data xa and $x_{max}$ is determined as the pixel data xl.

The minimum correlation value $L_{min}$ and the pixel data xl are thus found. The minimum correlation value $R_{min}$ and the pixel data xr are also found in the same manner as the minimum correlation value $L_{min}$ and the pixel data xl.

When the minimum correlation values $L_{min}$ and $R_{min}$ and the pixel data xl and xr in a case where the minimum correlation values are respectively given are found at the step 3, the pixel data corresponding to the smaller one of the minimum correlation value $L_{min}$ and $R_{min}$ is extracted (step 4).

When the minimum correlation values $L_{min}$ and $R_{min}$ differ from each other, one pixel data is extracted. When the minimum correlation values $L_{min}$ and $R_{min}$ are the same, two pixel data are extracted.

When one pixel data xl or xr is extracted at the step 4 (YES at step 5), the extracted pixel data is determined as the pixel data x on the interpolated pixel X (step 6). When two (a plurality of) pixel data xl and xr are selected at the step 4 (NO at step 5), the average of the pixel data xl and xr is determined as the pixel data x on the interpolated pixel X (step 7) The details are as follows:

if $L_{min}<R_{min}$, then x=xl
if $L_{min}>R_{min}$, then x=xr
if $L_{min}=R_{min}$, then x=(xl+xr)/2

Figure 6:
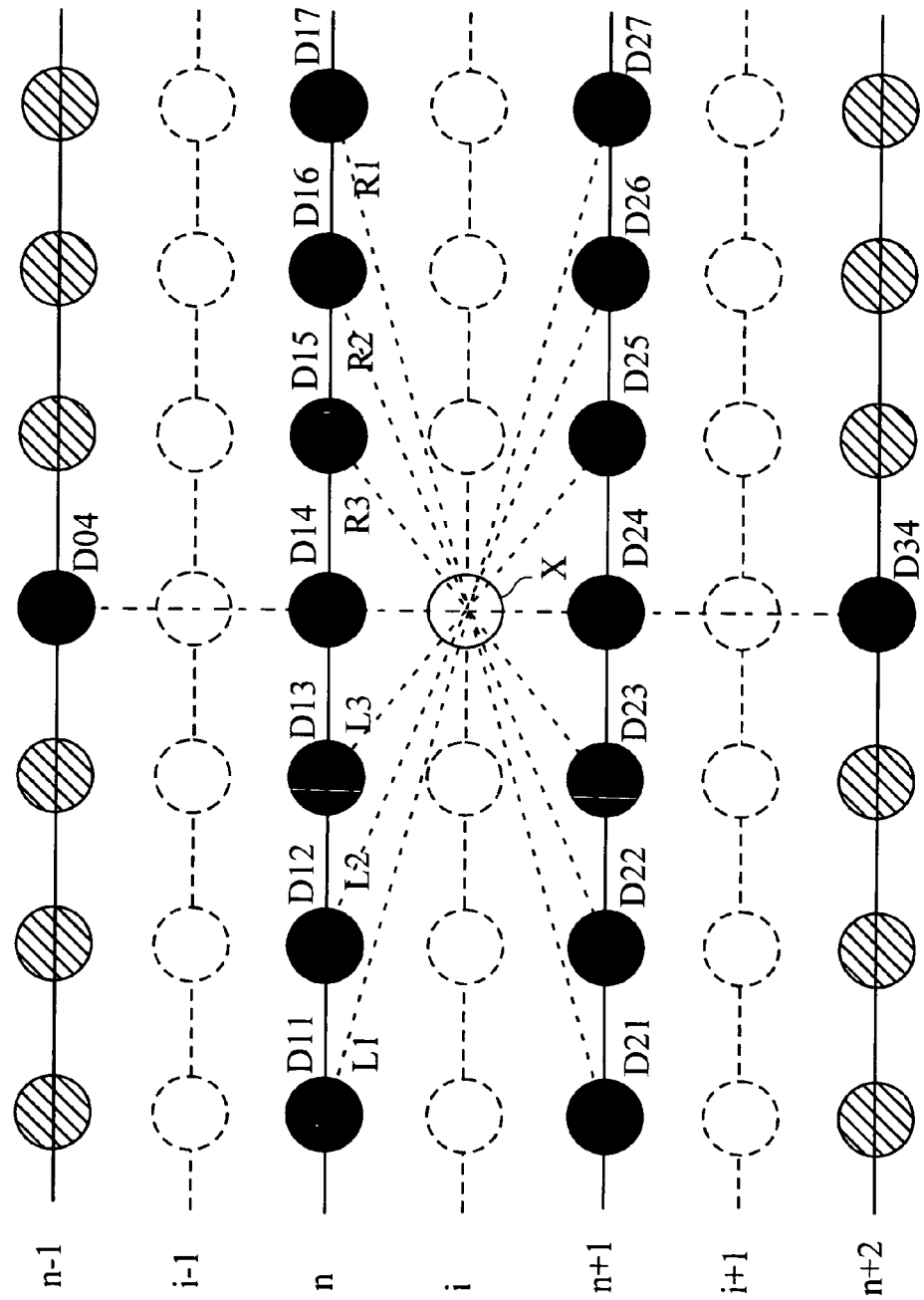
FIG. 6 is a schematic view showing the relationship between original pixels and an interpolated pixel.

Although at the foregoing step 3, two sets are selected as the set of opposed pixels between which the interpolated pixel X is sandwiched diagonally, two or more sets may be selected. For example, six sets of opposed pixels, for example, D11 and D27, D12 and D26, D13 and D25, D15 and D23, D16 and D22, and D17 and D21 may be selected, as shown in FIG. 6. In this case, pixel data in a case where the minimum correlation value is given is found at the step 3 for each of the sets of opposed pixels. That is, six candidates for the pixel data are found.

When the number of minimums of the minimum correlation values corresponding to the six sets of opposed pixels is three or more, three or more pixel data are extracted from the six candidates for the pixel data.

When three or more pixel data are selected at the step 4, there are three methods, as described below, as a method of determining the pixel data x on the interpolated pixel X.

The first method is one for calculating the average of three or more pixel data selected at the step 4 and determining the result of the calculation as the pixel data x on the interpolated pixel X. The second method is one for extracting the maximum and the minimum of three or more pixel data selected at the step 4 and calculating the average of the maximum and the minimum, and determining the result of the calculation as the pixel data x on the interpolated pixel X.

The third method is one for selecting pixel data obtained from opposed pixels in closest proximity to the interpolated pixel X out of three or more pixel data selected at the step 4, and determining the selected pixel data as the pixel data x on the interpolated pixel X. When there exist two pixel data obtained from the opposed pixels in closest proximity to the interpolated pixel X, the average of the pixel data is calculated, and the result of the calculation is determined as the pixel data x on the interpolated pixel X.

[1-1] Description of Image Interpolating Device Using First Image Interpolating Method

[1-1-1] Description of First Image Interpolating Device

Although in the foregoing item [1], description was made of the image interpolating method in a case where the number of sets of diagonally opposed pixels is set to two, description is herein made of a case where the number of sets of diagonally opposed pixels is six, as described using FIG. 6. Description is made of an image interpolating device for performing one-dimensional interpolation in the vertical direction in order to simplify the description,.

Figure 7:
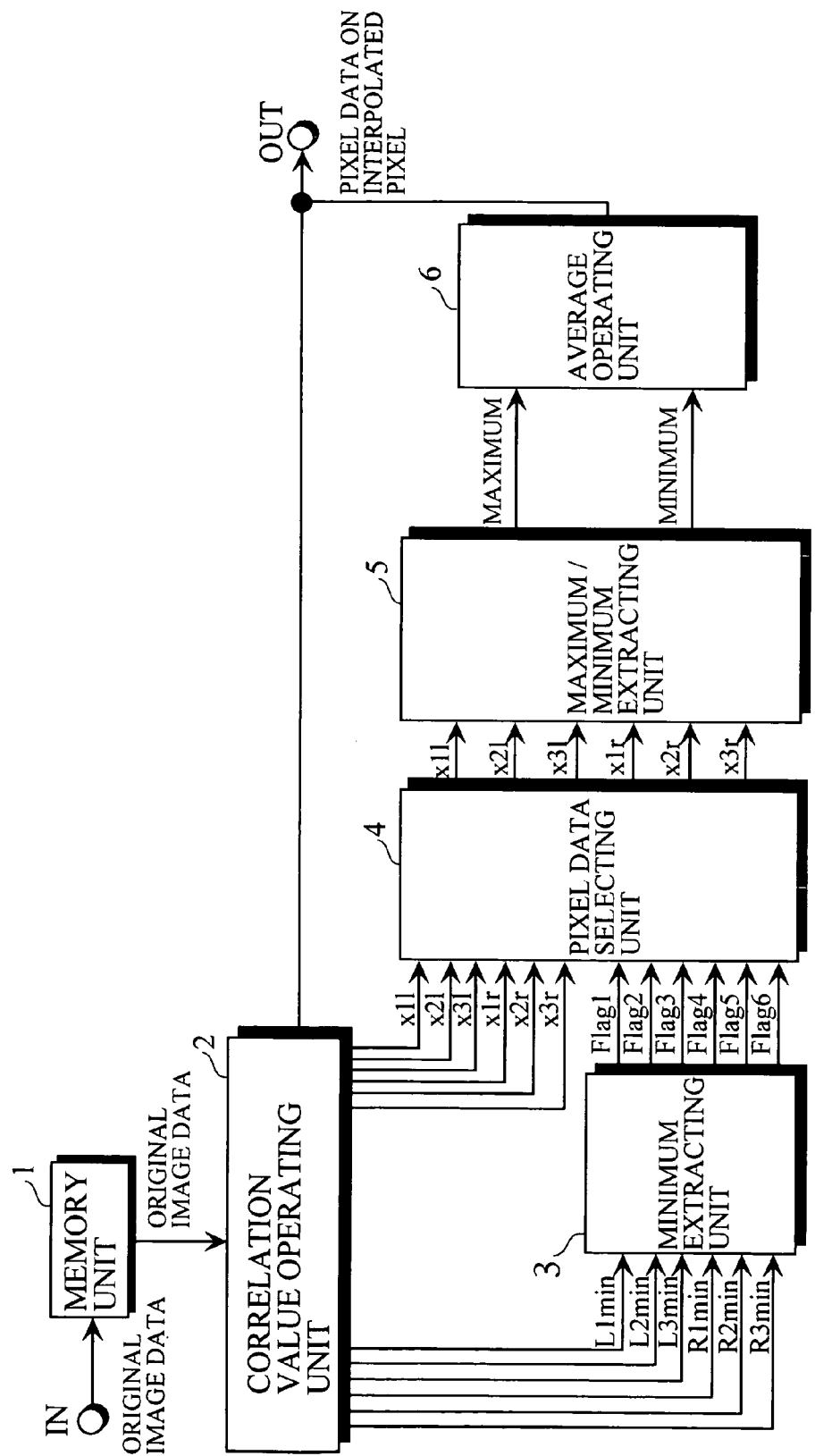
FIG. 7 is a block diagram showing the configuration of a first image interpolating device.

FIG. 7 illustrates the configuration of a first image interpolating device.

A memory unit 1 stores pixel data on an original pixel inputted through an input terminal IN. A correlation value operating unit 2 uses the pixel data on the original pixel stored in the memory unit 1, to calculate six minimum correlation values $L1_{min}$ to $L3_{min}$ and $R1_{min}$ to $R^3$ in which are obtained from six sets of opposed pixels and pixel data x1*l* to x3*l* and x1*r* to x3*r* in a case where the six minimum correlation values are respectively given.

The minimum extracting unit 3 identifies the minimum correlation value which is the minimum of the six minimum correlation values $L1_{min}$ to $L3_{min}$ and $R1_{min}$ to $R3_{min}$ calculated by the correlation value operating unit 2. A pixel data selecting unit 4 selects, out of the six pixel data x1*l* to x3*l* and x1*r* to x3*r* which are fed from the correlation value operating unit 2 on the basis of the result of the identification in the minimum extracting unit 3, the pixel data which are candidates for pixel data on an interpolated pixel X.

A maximum/minimum extracting unit 5 extracts the pixel data which are the maximum and the minimum of the pixel data selected by the pixel data selecting unit 4. An average operating unit 6 calculates the average of the two pixel data extracted in the maximum/minimum extracting unit 5, and outputs the result of the calculation to an output terminal OUT as the pixel data on the interpolated pixel X.

Description is made of the operation of the image interpolating device.

FIG. 6 illustrates the relationship between original pixels and a pixel to be interpolated.

As shown in FIG. 6, original pixels D04, D11 to D17, D21 to D27, and D34 shall be arranged with respect to an interpolated pixel X. Pixel data on the interpolated pixel X and the original pixels D04, D11 to D17, D21 to D27, and D34 shall be respectively denoted by x and d04, d11 to d17, d21 to d27, and d34.

First, the pixel data on the four original pixels D04, D14, D24, and D34 just above and just below the interpolated pixel X are inputted from the memory unit 1 to the correlation value operating unit 2, where an edge component E is found by the following equation (24):

$$E = -d04 + d14 + d24 - d34 \quad (24)$$

By the edge component E thus found, a range S where the pixel data x on the interpolated pixel X is settable is found by the same method as that at the step 2 shown in FIG. 2. On the basis of the following equations (25) to (30) respectively expressing a correlation value L1 between the pixel data on the opposed pixels D11 and D27 and the pixel data on the interpolated pixel X, a correlation value L2 between the pixel data on the opposed pixels D12 and D26 and the pixel data on the interpolated pixel X, a correlation value L3 between the pixel data on the opposed pixels D13 and D25 and the pixel data on the interpolated pixel X, a correlation value R1 between the pixel data on the opposed pixels D17 and D21 and the pixel data on the interpolated pixel S, a correlation value R2 between the pixel data on the opposed pixels D16 and D22 and the pixel data on the interpolated pixel X, and a correlation value R3 between the pixel data on the opposed pixels D15 and D23 and the pixel data on the interpolated pixel X, the respective minimums $L1_{min}$ to $L3_{min}$ and $R1_{min}$ to $R3_{min}$ of the correlation values L1 to L3 and R1 to R3 and pixel data x1*l* to x3*l* and x1*r* to x3*r* in a case where the minimums are respectively given are found in the same method as that at the step 3 shown in FIG. 2.

$$L1 = |d11 - x| + |d27 - x| \quad (25)$$

$$L2 = |d12 - x| + |d26 - x| \quad (26)$$

$$L3 = |d13 - x| + |d25 - x| \quad (27)$$

$$R1 = |d17 - x| + |d21 - x| \quad (28)$$

$$R2 = |d16 - x| + |d22 - x| \quad (29)$$

$$R3 = |d15 - x| + |d23 - x| \quad (25)$$

When the minimums $L1_{min}$ to $L3_{min}$ and $R1_{min}$ to $R3_{min}$ of the correlation values L1 to L3 and R1 to R3 and the pixel data x1*l* to x3*l* and x1*r* to x3*r* in a case where the minimums are respectively given are thus found by the correlation value operating unit 2, the minimums $L1_{min}$ to $L3_{min}$ and $R1_{min}$ to $R3_{min}$ are fed to the minimum extracting unit 3, and the pixel data x1*l* to x3*l* and x1*r* to x3*r* are fed to the pixel data selecting unit 4.

The minimum extracting unit 3 receives the minimum correlation values $L1_{min}$ to $L3_{min}$ and $R1_{min}$ to $R3_{min}$ and outputs Flag1 to Flag6 which are control signals respectively corresponding to the inputted minimum correlation values $L1_{min}$ to $L3_{min}$ and $R1_{min}$ to $R3_{min}$.

The minimum extracting unit 3 outputs the control signals Flag1 to Flag6 respectively corresponding to the minimums $L1_{min}$ to $L3_{min}$ and $R1_{min}$ to $R3_{min}$ of the correlation values L1 to L3 and R1 to R3. The control signal corresponding to the smallest one of the minimums $L1_{min}$ to $L3_{min}$ and $R1_{min}$ to $R3_{min}$ of the correlation values L1 to L3 and R1 to R3 is considered to be High, and the control signals corresponding to the other minimums are considered to be Low.

When $L1_{min}$ and $R2_{min}$ are the smallest of the minimums $L1_{min}$ to $L3_{min}$ and $R1_{min}$ to $R3_{min}$, for example, the control signals Flag1 and Flag5 are considered to be High, and the other control signals Flag2 to Flag4 and Flag6 are considered to be Low. The number of control signals which are High is not limited to two, as in this example. The number of control signals is any one of one to six.

The control signals Flag1 to Flag6 which are outputted from the minimum extracting unit 3 are fed to the pixel data selecting unit 4. In the pixel data selecting unit 4, the pixel data corresponding to the control signal which is High out of the control signals fed from the minimum extracting unit 3 is outputted to the maximum/minimum extracting unit 5.

When the control signals Flag1 and Flag5 fed from the minimum extracting unit 3 are High, and the other control signals Flag2 to Flag4 and Flag6 are Low, as in the above-mentioned example, the pixel data x1$l$ and x2$r$ are selected and are fed to the maximum/minimum extracting unit 5.

In the maximum/minimum extracting unit 5, the maximum pixel data and the minimum pixel data are selected out of the pixel data fed from the pixel data selecting unit 4, and are fed to the average operating unit 6. In the average operating unit 6, the average of the two pixel data fed from the maximum/minimum extracting unit 5 is calculated, and the result of the calculation is outputted to the output terminal OUT as the pixel data x on the interpolated pixel X.

When only one of the pixel data is fed to the maximum/minimum extracting unit 5, the maximum/minimum extracting unit 5 feeds the one pixel data to the average operating unit 6. In this case, the average operating unit 6 outputs the fed one pixel data as it is as the pixel data x on the interpolated pixel X.

The pixel data on the original pixel is outputted to the output terminal OUT through the memory unit 1 and the correlation value operating unit 2. That is, after the pixel data on the original pixel on the line n is outputted, the pixel data on the interpolated pixel on the line i is outputted.

When a threshold Th for comparing edge components in the correlation value operating unit 2 is made changeable in such a manner that it can be inputted from the exterior, an image to be reproduced can be subjected to most suitable interpolation processing.

Although the first image interpolating device increases the number of lines, the same interpolation processing may be performed in the horizontal direction in order to increase the number of pixels on the line.

When in FIG. 7, the maximum/minimum extracting unit 5 and the average operating unit 6 are omitted, an average operating unit is provided in the succeeding stage of the pixel data selecting unit 4, and a plurality of pixel data are selected by the pixel data selecting unit 4, the average of the pixel data may be calculated, to output the result of the calculation to the output terminal OUT as the pixel data x on the interpolated pixel X.

[1-1-2] Description of Second Image Interpolation Device

Figure 8:
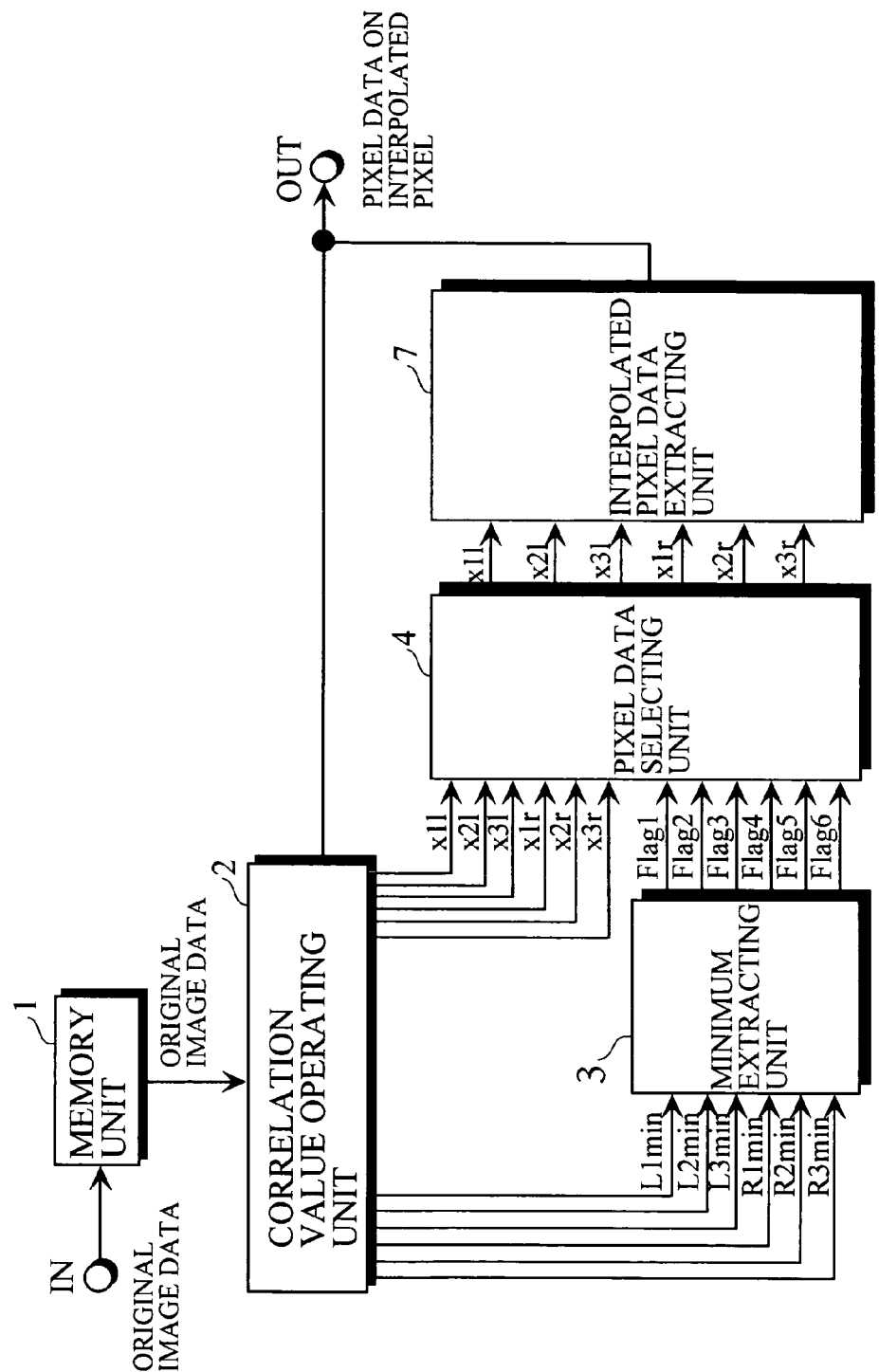
FIG. 8 is a block diagram showing the configuration of a second image interpolating device.

FIG. 8 illustrates the configuration of a second image interpolating device.

In FIG. 8, the same units as those shown in FIG. 7 are assigned the same reference numerals and hence, the description thereof is not repeated. The relationship between an interpolated pixel X and original pixels shall be a relationship as shown in FIG. 6.

The image interpolating device comprises an input terminal IN, an output terminal OUT, a memory unit 1, a correlation value operating unit 2, a minimum extracting unit 3, a pixel data selecting unit 4, and an interpolated pixel data extracting unit 7 for extracting pixel data found from opposed pixels in closest proximity to the interpolated pixel X out of pixel data fed from the pixel data selecting unit 4.

The operations of the memory unit 1, the correlation value operating unit 2, the minimum extracting unit 3, and the pixel data selecting unit are the same as those of the memory unit 1, the correlation value operating unit 2, the minimum extracting unit 3, and the pixel data selecting unit 4 show in FIG. 7.

Minimum correlation values $L1_{min}$ to $L3_{min}$ and $R1_{min}$ to $R3_{min}$ and pixel data x1$l$ to x3$l$ and x1$r$ to x3$r$ are found in the correlation value operating unit 2. The minimum correlation values $L1_{min}$ to $L3_{min}$ and $R1_{min}$ to $R3_{min}$ are fed to the minimum extracting unit 3, and the pixel data x1$l$ to x3$l$ and x1$r$ to x3$r$ are fed to the pixel data selecting unit 4.

Control signals Flag1 to Flag6 respectively corresponding to the minimum correlation values $L1_{min}$ to $L3_{min}$ and $R1_{min}$ to $R3_{min}$ are outputted from the minimum extracting unit 3. In the pixel data selecting unit 4, the pixel data corresponding to the control signal which is High is selected from the pixel data x1$l$ to x3$l$ and x1$r$ to x3$r$ and is fed to the interpolated pixel data extracting unit 7.

The interpolated pixel data extracting unit 7 extracts the pixel data obtained from the set of opposed pixels in closest proximity to the interpolated pixel X out of the pixel data fed by the pixel data selecting unit 4, and outputs the pixel data to the output terminal OUT as pixel data x on the interpolated pixel X. In this case, when the number of extracted pixel data is two, the average of the pixel data is calculated, and the result of the calculation is outputted to the output terminal OUT as the pixel data x on the interpolated pixel X When the pixel data selected by the pixel data selecting unit 4 are x1$l$, x2$l$, and x1$r$, for example, the pixel data obtained from the set of opposed pixels in closest proximity to the interpolated pixel X is the pixel data x2$l$ obtained from opposed pixels D12 and D26. Accordingly, the pixel data x2$l$ is outputted to the output terminal OUT as the pixel data x on the interpolated pixel X.

When the pixel data selected by the pixel data selecting unit 4 are x1$l$, x2$l$, and x2$r$, the pixel data obtained from the set of opposed pixels in closest proximity to the interpolated pixel X are the pixel data x2$l$ obtained from the opposed pixels D12 and D26 and the pixel data x2$r$ obtained from opposed pixels D16 and D22. Accordingly, the average (x2$l$+x2$r$)/2 of the pixel data x2$l$ and x2$r$ is outputted to the output terminal OUT as the pixel data x on the interpolated pixel X.

The pixel data on the original pixel is outputted to the output terminal OUT through the memory unit 1 and the correlation value operating unit 2. That is, the pixel data on the original pixel on the line n is outputted, and the pixel data on the interpolated pixel on the line i is then outputted.

The second image interpolating device increases the number of lines. In order to increase the number of pixels on the line, however, the same interpolation processing may be performed in the horizontal direction.

Figure 9:
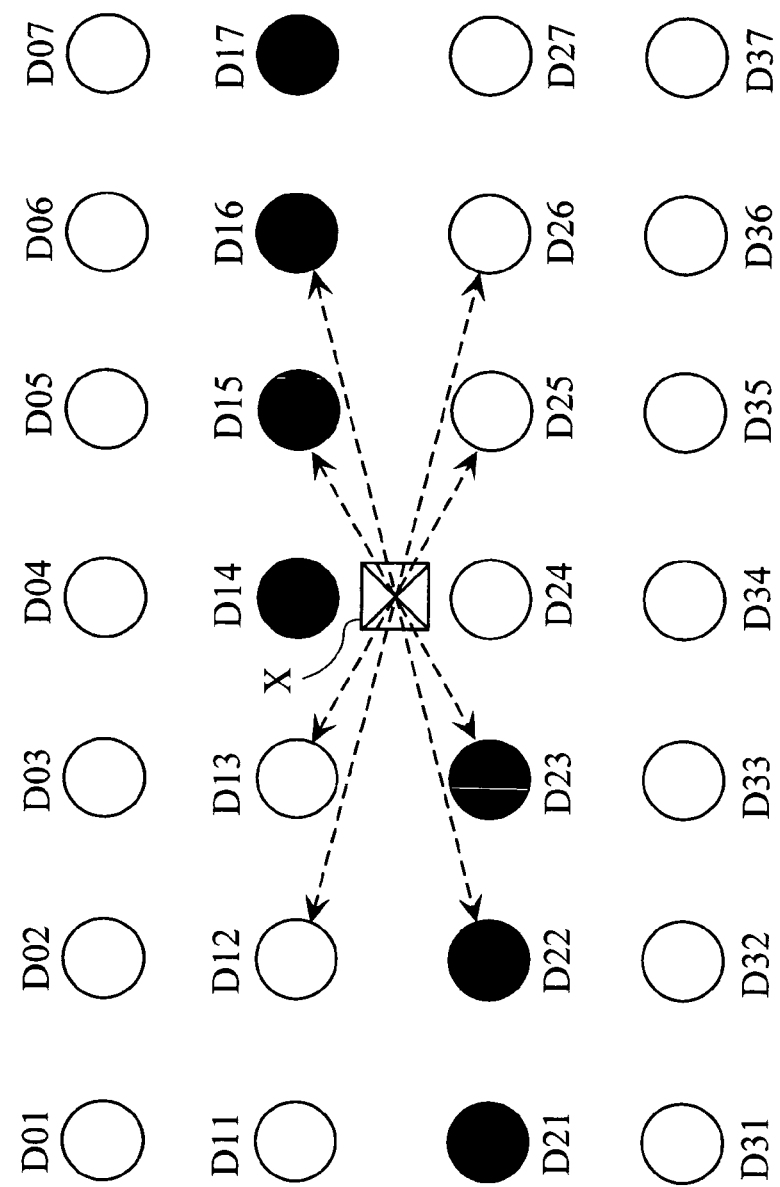
FIG. 9 is a schematic view for explaining the advantage of the first image interpolating method.

In the first image interpolating method, after a range where the pixel data on the interpolated pixel is settable is determined on the basis of an edge component E, candidates for the pixel data on the interpolated pixel are extracted on the basis of diagonal correlation values. The advantage that the range where the pixel data on the interpolated pixel is settable is determined will be described using FIG. 9. In FIG. 9, a black circle indicates an original pixel represented by black data, and a white circle indicates an original pixel represented by white data. X denotes the interpolated pixel.

In the description of FIG. 9, the white data shall be "1" and the black data shall be "0" in order to simplify the description.

When there is a black thin line in a white background, as shown in FIG. 9, it is preferable that the pixel data on the interpolated pixel X is taken as the black data "0".

Description is made of a case where the candidates for the pixel data on the interpolated pixel are extracted on the basis of the diagonal correlation values without determining the range where the pixel data on the interpolated pixel is settable. In this case, the minimum of a correlation value (|d13−x|+|d25−x|) corresponding to opposed pixels D13 and D25 is |1−1|+|1−1|=0, and the pixel data x in a case where the minimum correlation value is given is 1. Further, the minimum of a correlation value (|d15−x|+|d23−x|) corresponding to opposed pixels D15 and D23 is |0−0|+|0−0|=0, and the pixel data x in a case where the minimum correlation value is given is 0. Consequently, the pixel data x on the interpolated pixel X is (1+0)/2=0.5, and is not black data.

Description is made of a case where the range where the pixel data on the interpolated pixel is settable is determined as in the first image interpolating method, and the candidates for the pixel data on the interpolated pixel are extracted on the basis of diagonal correlation values. In this case, an edge component E (=−d04+d14+d24−d34) is −1+0+1−1=−1, and the range where the pixel data x on the interpolated pixel X is settable is 0≦x≦0.5.

When the minimum of a correlation value corresponding to the opposed pixels D13 and D25 is found in the settable range, |1−0.5|+|1−0.5|=1, and the pixel data x in a case where the minimum correlation value is given is 0.5. Further, the minimum of a correlation value corresponding to the opposed pixels D15 and D23 is |0−0|+|0−0|=0, and the pixel data x in a case where the minimum correlation value is given is 0. Consequently, the pixel data x on the interpolated pixel X is 0.

[2] Description of Second Image Interpolating Method

Description is made of a second image interpolating method. A two-dimensional image has two-dimensional expanse in the horizontal direction and the vertical direction. However, a method of one-dimensional interpolation in the vertical direction will be described in order to simplify the description.

Figure 10:
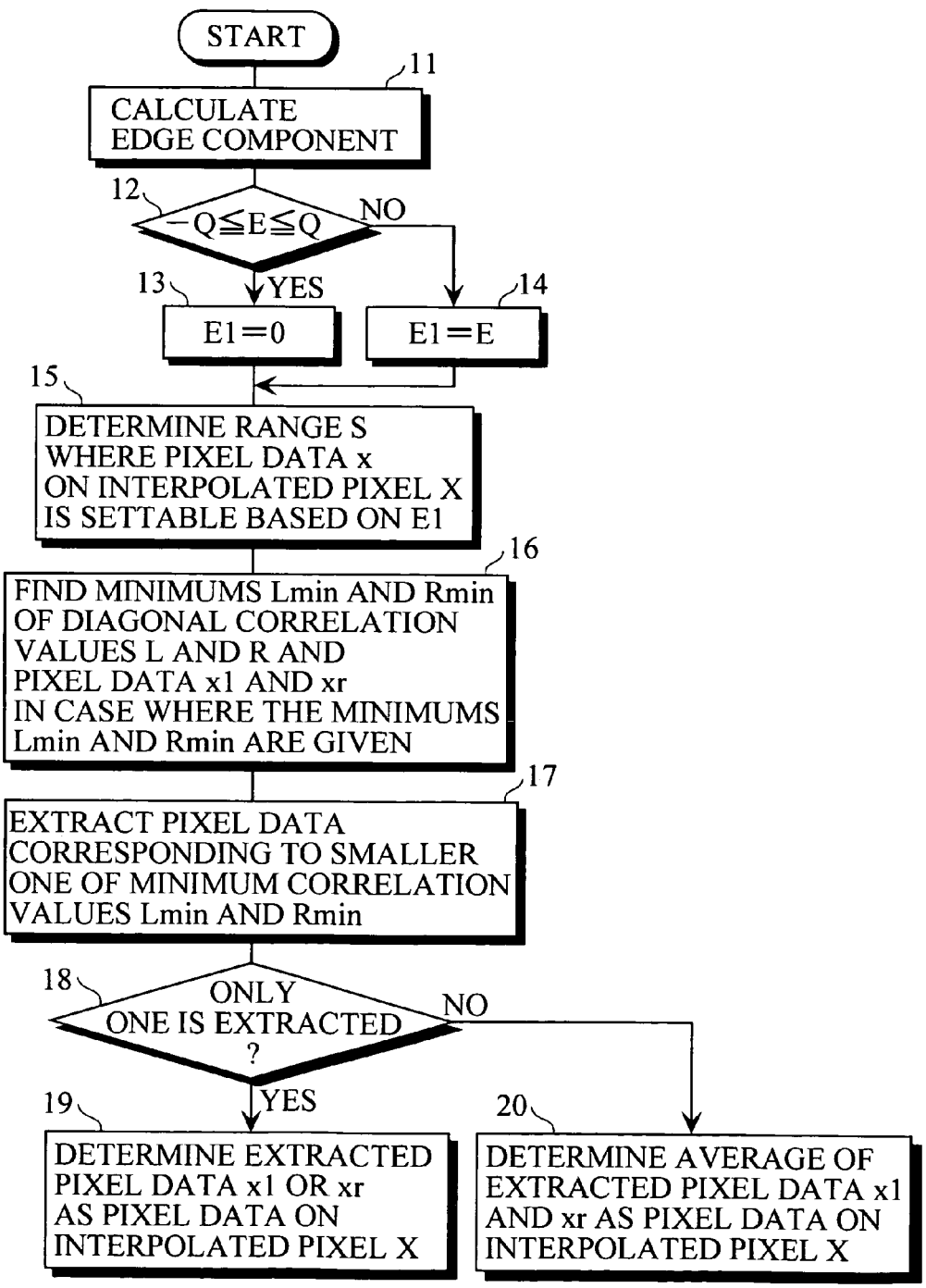
FIG. 10 is a flow chart showing the procedure for a second image interpolating method.

FIG. 10 shows the procedure for image interpolation processing by the second image interpolating method.

Figure 11:
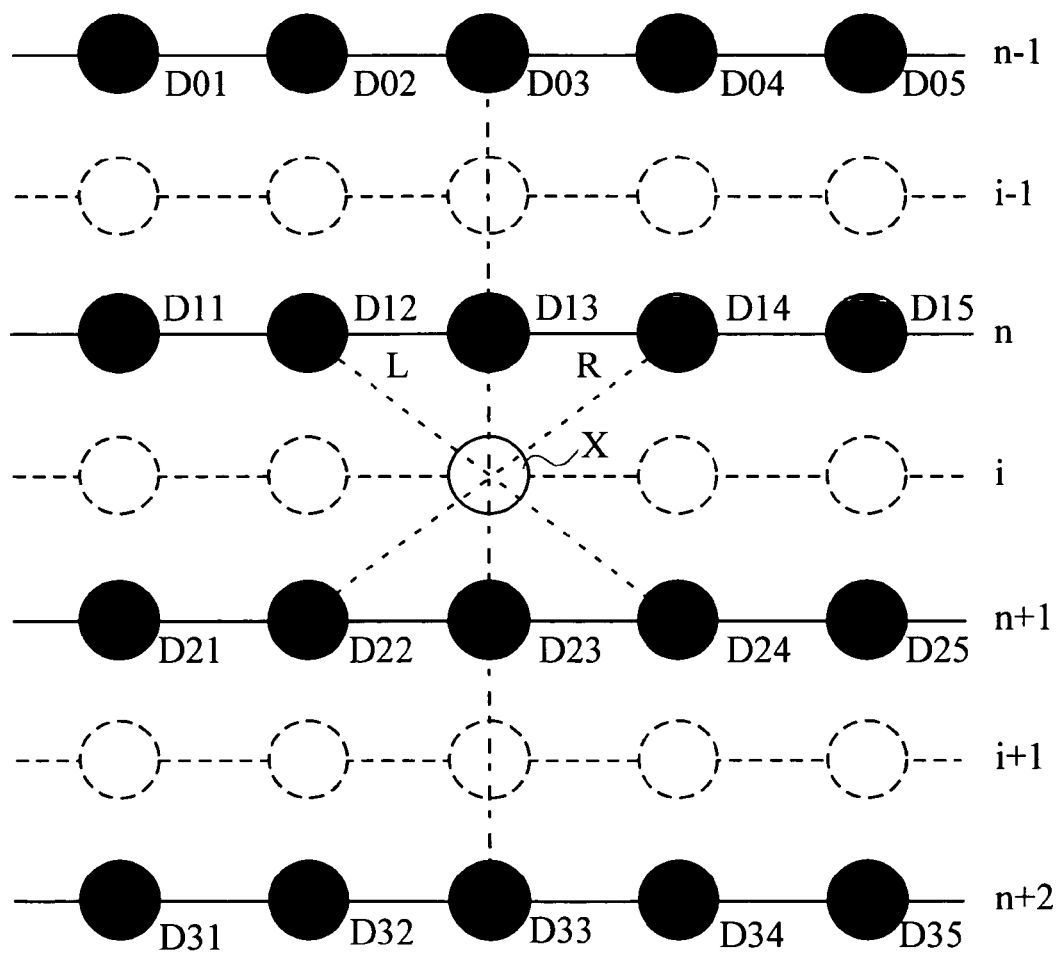
FIG. 11 is a schematic view showing the relationship between original pixels and an interpolated pixel.

Description is herein made of a method of finding pixel data on an interpolated pixel X on a line i between a line n and a line (n+1) and between an original pixel D13 on the line n and an original pixel D23 on the line (n+1), as shown in FIG. 11.

First, an edge component E is calculated in order to judge whether or not the interpolated pixel X exists in the vicinity of an edge of an original image (step 11). That is, the edge component E is found from the following equation (31) using pixel data on two original pixels D03 and D13 just above the interpolated pixel X and original pixels D23 and D33 just below the interpolated pixel X:

$$E = -d03 + d13 + d23 - d33 \quad (31)$$

It is then judged whether or not the edge component E is within a range of −Q≦E≦Q, letting N be a pseudo noise component previously set (step 12). The pseudo noise component Q is a variable which can be controlled from the exterior.

The edge component E is corrected on the basis of the result of the judgment. That is, letting E1 be an edge component after the correction, the edge component E1 after the correction is set to zero when the edge component E is within the range of −Q≦E≦Q (step 13).

When the edge component E is outside the range of −Q≦E≦Q, that is, E<−Q or E>Q, the edge component E1 after the correction is set to E (step 14).

Figure 12:
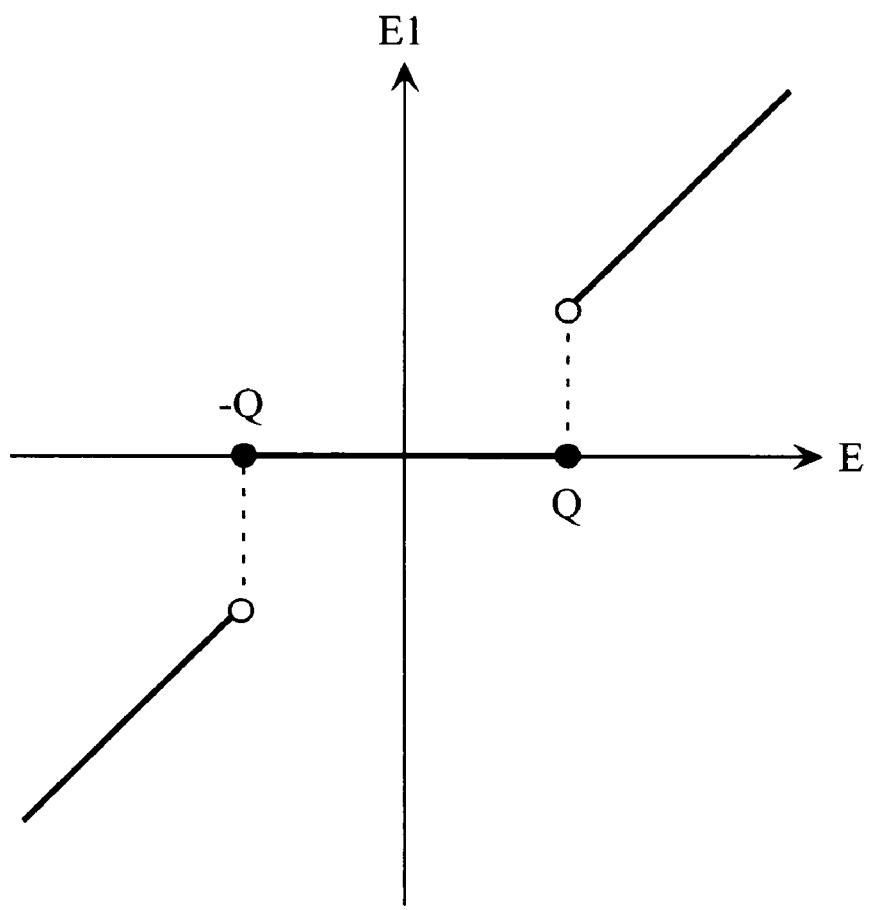
FIG. 12 is a graph of an edge component E against an edge component E1 after correction.

Consequently, the relationship between the edge component E and the edge component E1 after the correction is expressed by the following equations 32, and is expressed by a graph as shown in FIG. 12:

$$E1 = 0 \ (-Q \leq E \leq Q)$$

$$E1 = E \ (E > Q \text{ or } E < -Q) \quad (32)$$

The edge component E is thus corrected using the pseudo noise component Q, thereby reducing the effect of noises appearing in the edge component E.

A range S where pixel data x on the interpolated pixel X is settable is then determined on the basis of the edge component E1 after the correction (step 15).

Description is made of a method of determining the settable range S on the basis of FIG. 13. In FIG. 13, $d_{max}$ denotes the larger one of pixel data d13 and d23 on the original pixels D13 and D23, and $d_{min}$ denotes the smaller one of the pixel data d13 and d23. dc denotes the average $(d_{max} + d_{min})/2$ of $d_{max}$ and $d_{min}$.

(1) Range S Where Pixel Data x is Settable When

Figure 13A:
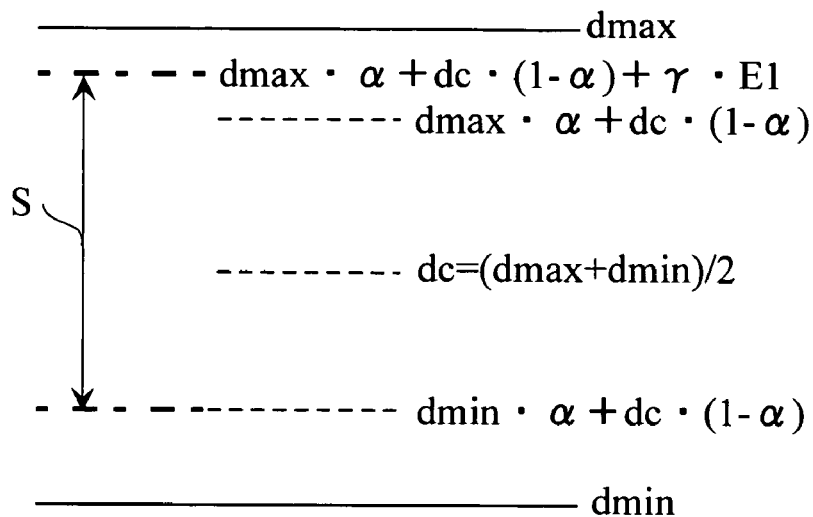
FIGS. 13(a) and 13(b) are schematic views showing a range S where pixel data x on an interpolated pixel X is settable.

As shown in FIG. 13(a), $d_{min} \times \alpha + dc \times (1-\alpha) \leq S \leq d_{max} \times \alpha + dc \times (1-\alpha) + E1 + \gamma$, where α and γ are variables which can be controlled from the exterior.

That is, when the edge component E1 is not less than zero, the range S where the pixel data x is settable is a range expanded upward by the value of γ·E1 from a range centered around dc $[d_{min} \times \alpha + dc \times (1-\alpha) \leq x \leq d^{max} \times \alpha + dc \times (1-\alpha)]$.

(2) Range S Where Pixel Data x is Settable When E1<0

Figure 13B:
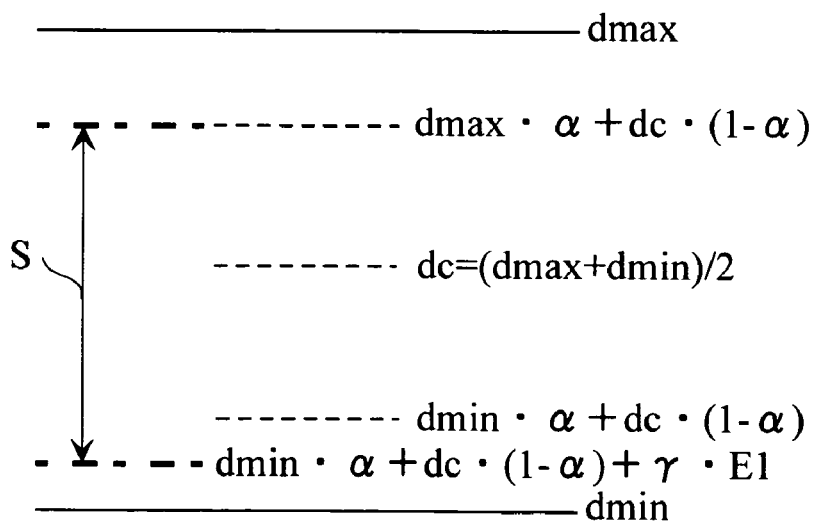

As shown in FIG. 13(b), $d_{min} \times \alpha + dc \times (1-\alpha) + E1 \times \gamma \leq S \leq d_{max} \times \alpha + dc \times (1-\alpha)$.

That is, when the edge component E1 is less than zero, the range S where the pixel data x is settable is a range expanded downward by the value of γ·E1 from a range centered around dc $[d_{min} \times \alpha + dc \times (1-\alpha) \leq x \leq d^{max} \times \alpha + dc \times (1-\alpha)]$.

Candidates for the pixel data on the interpolated pixel X are then found from the range S where the pixel data x on the interpolated pixel X is settable on the basis of pixel data on opposed pixels between which the interpolated pixel X is sandwiched diagonally (step 16).

Although a method of finding the candidates for the pixel data on the interpolated pixel X is approximately the same as that at the step 3 shown in FIG. 2, equations for finding correlation values L and R differ from those at the step 3 shown in FIG. 2.

A correlation value L between pixel data on opposed pixels D12 and D24 and the pixel data on the interpolated pixel X is expressed by the following equation (33), and a correlation value R between pixel data on opposed pixels D14 and D22 and the pixel data on the interpolated pixel X is expressed by the following equation (34):

$$L = |d12 - x| + |d24 - x| + \beta1 \times H1 - \beta2 \times Vl \quad (33)$$

$$R = |d14 - x| + |d22 - x| + \beta1 \times Hr - \beta2 \times Vr \quad (34)$$

In the foregoing equation (33) and (34), β1 and β2 are variables which can be controlled from the exterior.

H1 denotes the larger one of an amount of change H11 of amounts d11 to d13 found by the following equation (35) and an amount of change H12 of amounts d23 to d25 found by the following equation (36). That is, H1=MAX (H11, H12). MAX (a, b) is a sign indicating that the larger one of a and b is selected.

Vl denotes the smaller one of an amount of change V11 of d02 to d22 found by the following equation (37) and an amount of change V12 of d14 to d34 found by the following equation (38). That is, V1=MIN (V11, V12). MIN (a, b) is a sign indicating that the smaller one of a and b is selected.

$$H11=|d11-d12|+|d12-d13| \quad (35)$$

$$H12=|d23-d24|+|d24-d25| \quad (36)$$

$$V11=|d02-d12|+|d12-d33| \quad (37)$$

$$V12=|d14-d24|+|d24-d34| \quad (38)$$

Hr denotes the larger one of an amount of change Hr of d13 to d15 found by the following equation (39) and an amount of change Hr2 of d21 to d23 found by the following equation (40). That is, Hr=MAX(Hr1, Hr2).

Vr denotes the smaller one of an amount of change Vr1 of d12 to d32 found by the following equation (41) and an amount of change Vr2 of d04 to d24 found by the following equation (42). That is, Vr=MIN (Vr1, Vr2).

$$Hr1=|d13-d14|+|d14-d15| \quad (39)$$

$$Hr2=|d21-d22|+|d22-d23| \quad (40)$$

$$Vr1=|d12-d22|+|d22-d32| \quad (41)$$

$$Vr2=|d04-d14|+|d14-d24| \quad (42)$$

Figure 14:
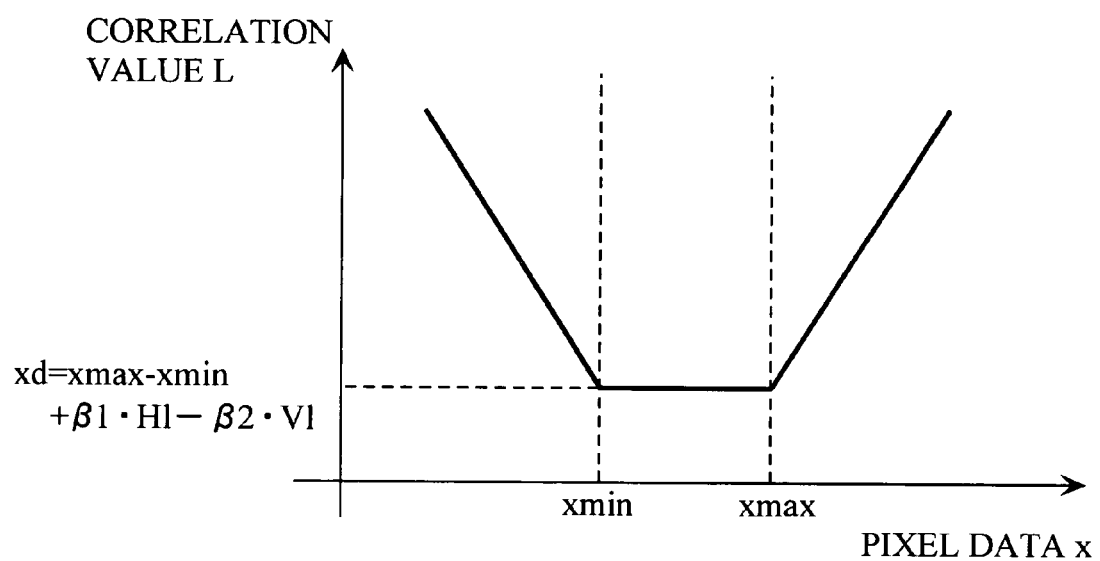
FIG. 14 is a graph of a correlation value L against pixel data x.

FIG. 14 illustrates the relationship between the correlation value L and the pixel data x. In FIG. 14, $x_{min}$ denotes the smaller one of the pixel data d12 and d24, and $x_{max}$ denotes the larger one of the pixel data d12 and d24. Further, $xd=x_{max}-x_{min}+\beta1\times H1-\beta2\times V1$.

When $xd=x_{max}-x_{min}+\beta1\times H1-\beta2\times V1$, the correlation value L expressed by the foregoing equation (33) can be changed, as in the following equations (43). The correlation value R can be similarly changed:

$$L=xd+2(x-x_{max})(x>x_{max})$$

$$L=xd(x_{min}\leq x\leq x_{max})$$

$$L=xd+2(x_{min}-x)(x\leq x_{min}) \quad (43)$$

Minimum correlation values $L_{min}$ and $R_{min}$ and pixel data xl and xr can be found in the method described in the second method at the step 3 shown in FIG. 2, that is, the same method as the method described using FIG. 5. In this case, xd in the graph shown in FIG. 5 indicates $x_{max}-x_{min}+\beta1\times H1-\beta2\times V1$.

When the minimum correlation values $L_{min}$ and $R_{min}$ and the pixel data x1 and xr in a case where the minimum correlation values are respectively given are found at the step 16, the pixel data corresponding to the smaller one of the minimum correlation values $L_{min}$ and $R_{min}$ is extracted (step 17).

When the minimum correlation values $L_{min}$ and $R_{min}$ differ from each other, one pixel data is extracted. When the minimum correlation values $L_{min}$ and $R_{min}$ are the same, two pixel data are extracted.

When one pixel data x1 or xr is extracted at the step 17 (YES at step 18), the extracted pixel data is determined as the pixel data x on the interpolated pixel X (step 19). When two (a plurality of) pixel data xl and xr are selected at the step 17 (NO at step 18), the average of the pixel data xl and xr is determined as the pixel data x on the interpolated pixel X (step 20).

Although description was made of the image interpolating method using a case where there are two sets of opposed pixels, the number of sets of opposed pixels may be two or more.

In the image interpolating device configured as shown in FIG. 7 or 8, when image interpolation is performed using the second image interpolating method, the correlation value operating unit 2 may be caused to perform the processing at the steps 11 to 16 shown in FIG. 10.

Figure 15:
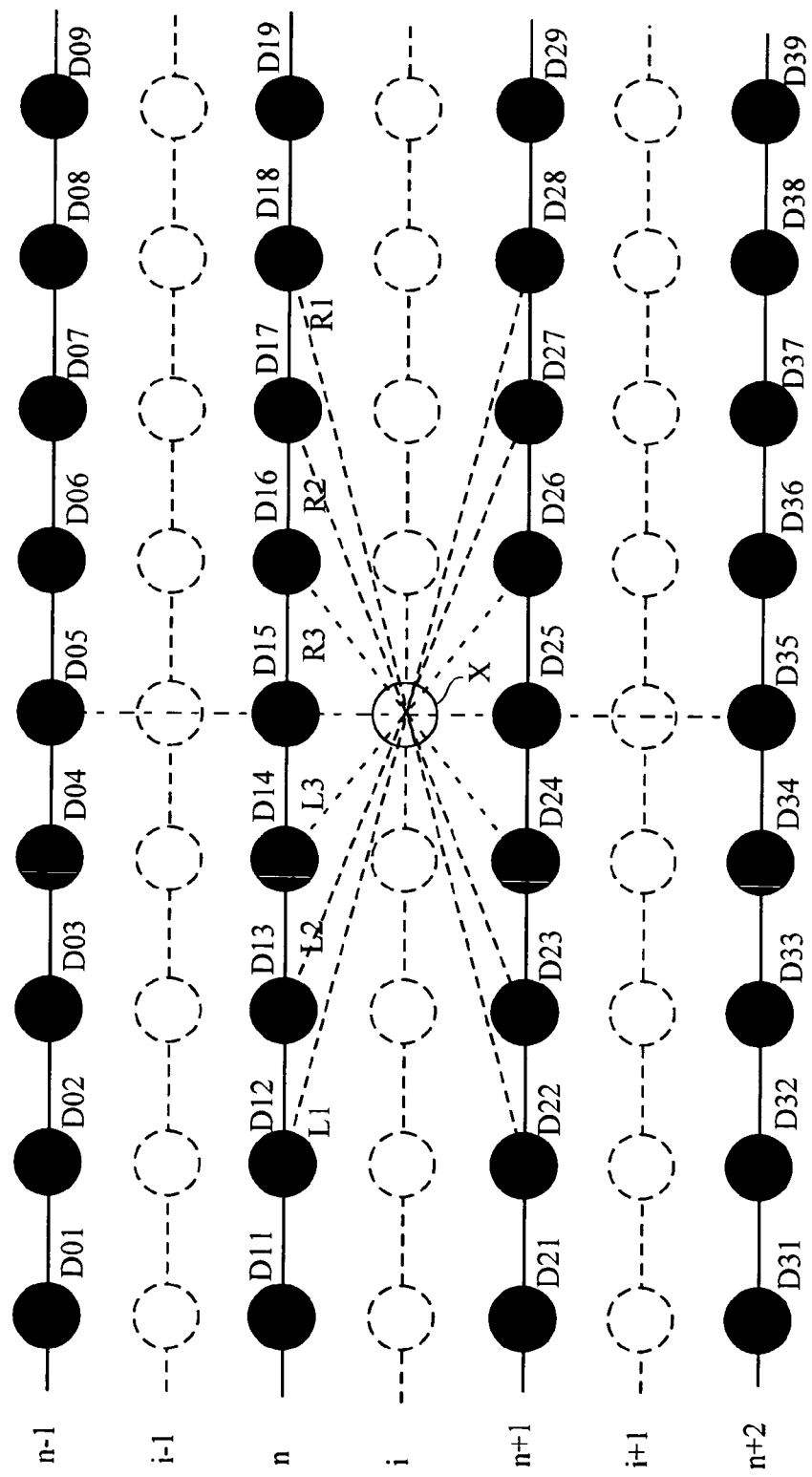
FIG. 15 is a schematic view showing the relationship between original pixels and an interpolated pixel.

Description is now made of the operation of the correlation value operating unit 2 in a case where pixel data x on an interpolated pixel X shown in FIG. 15 is found. Further, description is made of a case where the number of sets of diagonally opposed pixels is six.

The correlation value operating unit 2 first finds an edge component E on the basis of the following equation (44), as described at the step 11 shown in FIG. 10:

$$E=-d05+d15+d25-d35 \quad (44)$$

An edge component E1 whose effect of a noise component has been reduced is then found on the basis of the edge component E, as described at the steps 12 to 14 shown in FIG. 10. That is, the edge component E1 after the correction is corrected on the basis of the following equations (45):

$$E1=0(-Q\leq E\leq Q)$$

$$E1=E\ (E>Q\ or\ E<-Q) \quad (45)$$

A range S where the pixel data x on the interpolated pixel X is settable is then found, as described at the step 15 shown in FIG. 10, by the edge component E1 thus found.

Candidates for the pixel data on the interpolated pixel X are then found in the same method as that described at the step 16 shown in FIG. 10. In this example, the number of sets of opposed pixels between which the interpolated pixel X is sandwiched diagonally is six.

On the basis of the following equations (46) to (51) respectively expressing a correlation value L1 between pixel data on opposed pixels D12 and D28 and the pixel data on the interpolated pixel X, a correlation value L2 between pixel data on opposed pixels D13 and D27 and the pixel data on the interpolated pixel X, a correlation value L3 between pixel data on opposed pixels D14 and D26 and the pixel data on the interpolated pixel X, a correlation value R1 between pixel data on opposed pixels D18 and D26 and the pixel data on the interpolated pixel X, a correlation value R2 between pixel data on opposed pixels D17 and D23 and the pixel data on the interpolated pixel X, and a correlation value R3 between pixel data on opposed pixels D16 and D24 and the pixel data on the interpolated pixel, the respective minimums $L1_{min}$ to $L3_{min}$ and $R1_{min}$ to $R3_{min}$ of the correlation values L1 to L3 and R1 to R3 and pixel data x11 to x31 and x1r to x3r in a case where the minimums are respectively given are found:

$$L1=|d12-x|+|d28-x|+\beta1\times Hla-\beta2\times V1a \quad (46)$$

$$L2=|d13-x|+|d27-x|+\beta1\times Hla-\beta2\times V1b \quad (47)$$

$$L3=|d14-x|+|d26-x|+\beta1\times Hla-\beta2\times V1c \quad (48)$$

$$R1=|d18-x|+|d22-x|+\beta1\times Hra-\beta2\times Vra \quad (49)$$

$$R2=|d17-x|+|d23-x|+\beta1\times Hrb-\beta2\times Vrb \quad (51)$$

$$R3=|d16-x|+|d24-x|+\beta1\times Hrc-\beta2\times Vrc \quad (51)$$

Hla to Hlc, Hra to Hrc, Vla to Vlc, and Vra to Vrc in the foregoing equations (46) to (51) are expressed by the following equations (52) to (63);

$$Hla = \text{MAX}(Hla1, Hla2) \quad (52)$$

$$Hlb = \text{MAX}(Hlb1, Hlb2) \quad (53)$$

$$Hlc = \text{MAX}(Hlc1, Hlc2) \quad (54)$$

$$Hra = \text{MAX}(Hra1, Hra2) \quad (55)$$

$$Hrb = \text{MAX}(Hrb1, Hrb2) \quad (56)$$

$$Hrc = \text{MAX}(Hrc1, Hrc2) \quad (57)$$

$$Vla = \text{MIN}(Vla1, Vla2) \quad (58)$$

$$Vlb = \text{MIN}(Vlb1, Vlb2) \quad (59)$$

$$Vlc = \text{MIN}(Vlc1, Vlc2) \quad (60)$$

$$Vra = \text{MIN}(Vra1, Vra2) \quad (61)$$

$$Vrb = \text{MIN}(Vrb1, Vrb2) \quad (62)$$

$$Vrc = \text{MIN}(Vrc1, Vrc2) \quad (63)$$

Furthermore, Hla1 to Hlc1, Hla2 to Hlc2, Hra1 to Hrc1, Hra2 to Hrc2, Vla1 to Vlc1, Vla2 to Vlc2, Vra1 to Vrc2, and Vra2 to Vrc2 in the foregoing equations (52) to (63) are expressed by the following equations (64) to (87):

$$Hla1 = |d11-d12|+|d12-d13| \quad (64)$$

$$Hlb1 = |d12-d13|+|d13-d14| \quad (65)$$

$$Hlc1 = |d13-d14|+|d14-d15| \quad (66)$$

$$Hla2 = |d27-d28|+|d28-d29| \quad (67)$$

$$Hlb2 = |d26-d27|+|d27-d28| \quad (68)$$

$$Hlc2 = |d25-d26|+|d26-d27| \quad (69)$$

$$Hra1 = |d17-d18|+|d18-d19| \quad (70)$$

$$Hrb1 = |d16-d17|+|d17-d18| \quad (71)$$

$$Hrc1 = |d15-d16|+|d16-d17| \quad (72)$$

$$Hra2 = |d21-d22|+|d22-d23| \quad (73)$$

$$Hrb2 = |d22-d23|+|d23-d24| \quad (74)$$

$$Hrc2 = |d23-d24|+|d24-d25| \quad (75)$$

$$Vla1 = |d02-d12|+|d12-d22| \quad (76)$$

$$Vlb1 = |d03-d13|+|d13-d23| \quad (77)$$

$$Vlc1 = |d04-d14|+|d14-d24| \quad (78)$$

$$Vla2 = |d18-d28|+|d28-d38| \quad (79)$$

$$Vlb2 = |d17-d27|+|d27-d37| \quad (80)$$

$$Vlc2 = |d16-d26|+|d26-d36| \quad (81)$$

$$Vra1 = |d08-d18|+|d18-d28| \quad (82)$$

$$Vrb1 = |d07-d17|+|d17-d27| \quad (83)$$

$$Vrc1 = |d06-d16|+|d16-d26| \quad (84)$$

$$Vra2 = |d12-d22|+|d22-d32| \quad (85)$$

$$Vrb1 = |d13-d23|+|d24-d33| \quad (86)$$

When the minimum correlation values $L1_{min}$ to $L3_{min}$ and $R1_{min}$ to $R3_{min}$, and the pixel data x11 to x31 and x1r to x3r in a case where the minimums are respectively given are thus found in the correlation value operating unit 2, the minimum correlation values $L1_{min}$ to $L3_{min}$ and $R1_{min}$ to $R3_{min}$ are fed to the minimum extracting unit 3, and the pixel data x11 to x31 and x1r to x3r are fed to the pixel data selecting unit 4.

A method of determining the settable range S at the step 15 shown in FIG. 10 differs from the method of determining the settable range S at the step 2 shown in FIG. 2. The advantage of the method of determining the settable range S at the step 15 shown in FIG. 10 will be described using FIG. 16.

Figure 16:
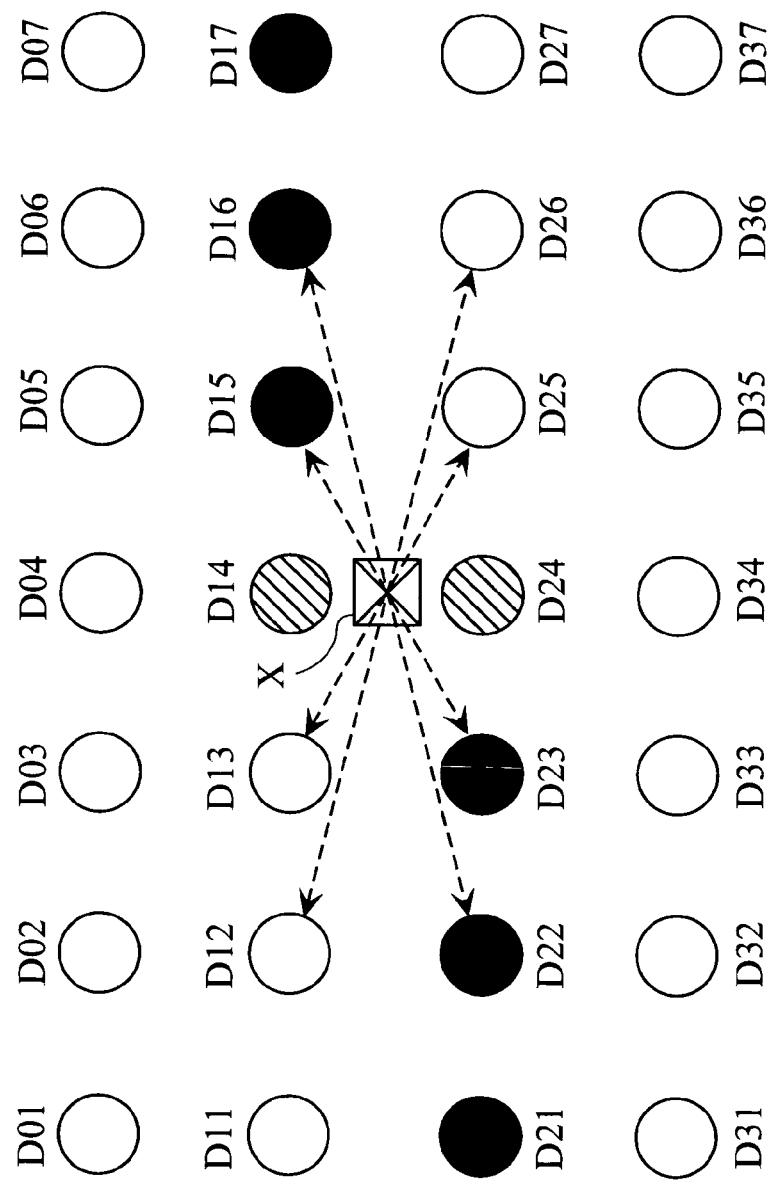
FIG. 16 is a schematic view for explaining the advantage of the second image interpolating method.

In FIG. 16, a black circle, a white circle, a hatched circle respectively indicate an original pixel represented by black data, an original pixel represented by white data, and a gray original pixel X denotes an interpolated pixel. In the description of FIG. 16, the white data shall be "1", the black data shall be "0", and the gray data shall be "0.5" in order to simplify description.

As shown in FIG. 16, there is a case where there are two black lines in a white background, and their boundary is gray. In such a case, it is preferable that pixel data on a pixel X to be interpolated between gray pixels in the boundary is the black data "0".

Description is made of a case where the pixel data on the interpolated pixel X is found by the first image interpolating method. In this case, an edge component E (=-d04+d14+d24-d34) is -1+0.5+0.5-1=-1, and a range S where the pixel data x on the interpolated pixel X is settable is 0.5. Consequently, the pixel data x on the interpolated pixel X is 0.5, and is not black data.

Description is made of a case where the pixel data on the interpolated pixel X is found, as in the second image interpolating method. Also in this case, an edge component E (=-d04+d14+d24-d34) is -1+0.5+0.5-1=-1. Further, E1=-1.

Since E1<0, the range S where the pixel data x on the interpolated pixel X is settable is $d_{min} \times \alpha + dc \times (1 \times \alpha) + E1 \times \gamma \leq S \leq d_{max} \times \alpha + dc \times (1-\alpha)$. For convenience of illustration, when a 1 and $\gamma=0.5$, the settable range S is $d_{min}+E1 \times 0.5- \leq S \leq d_{max}$. That is, $0.5-0.5 \leq S \leq 0.5$, i.e., $0 \leq S \leq 0.5$.

For convenience of illustration, when the minimum of the correlation values corresponding to opposed pixels D13 and D25 is found within the settable range S, considering β in the equations (46) to (51) for finding the correlation values to be zero, |1-0.5|+|1-0.5|=1, and the pixel data x in a case where the minimum correlation value is given is 0.5. Further, the minimum of the correlation values corresponding to opposed pixels D15 and D23 is |0-0|+0-0|=0, and the pixel data x in a case where the minimum correlation value is given is zero. Consequently, the pixel data x on the interpolated pixel X is zero.

A correlation value calculating equation used at the step 16 shown in FIG. 10 and the correlation value calculating equation used at the step 3 shown in FIG. 2 differ from each other. The advantage of the correlation value calculating equation used at a the step 16 shown in FIG. 16 will be described using FIG. 17.

Figure 17:
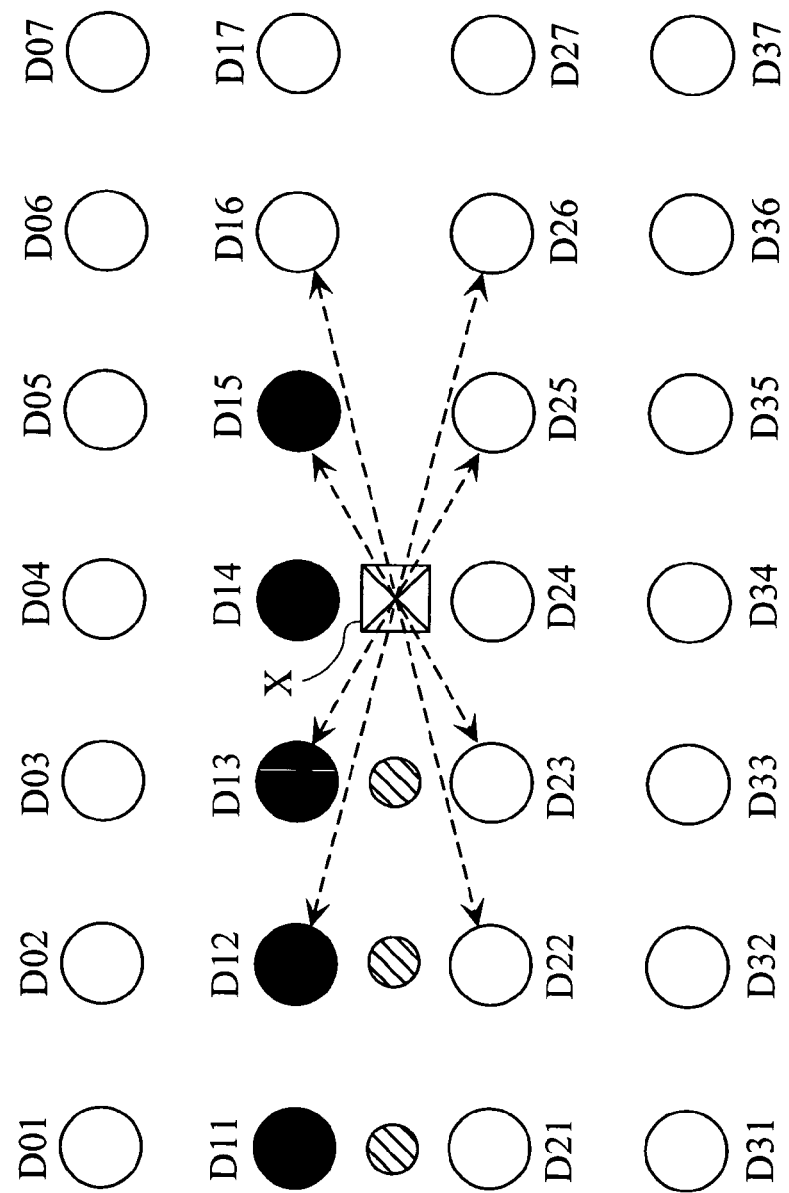
FIG. 17 is a schematic view for explaining the advantage of the second image interpolating method.

In FIG. 17, a black circle and a white circle respectively indicate an original pixel represented by black data and an original pixel represented by white data. X denotes an interpolated pixel. In the description of FIG. 17, the white data shall be "1", the black data shall be "0", and gray data shall be "0.5" in order to simplify the description.

As shown in FIG. 17, in a case where there is a black line in a white background, when the pixel X is interpolated between an original pixel D14 and an original pixel D24, pixel data on the interpolated pixel X is made larger than the pixel data on the interpolated pixel between an original pixel D13 and an original pixel D23, so that the thickness of the line is changed in the first image interpolating method.

In such a case, when the correlation value is found in consideration with the connection with pixels in the vicinity of the opposed pixels as in the second image interpolating method, the pixel data on the interpolated pixel X between the original pixel D14 and the original pixel D24 can be made equal to the pixel data on the interpolated pixel between the original pixel D13 and the original pixel D23.

[3] Description of Third Image Interpolating Method

Description is now made of a third image interpolating method.

Figure 18:
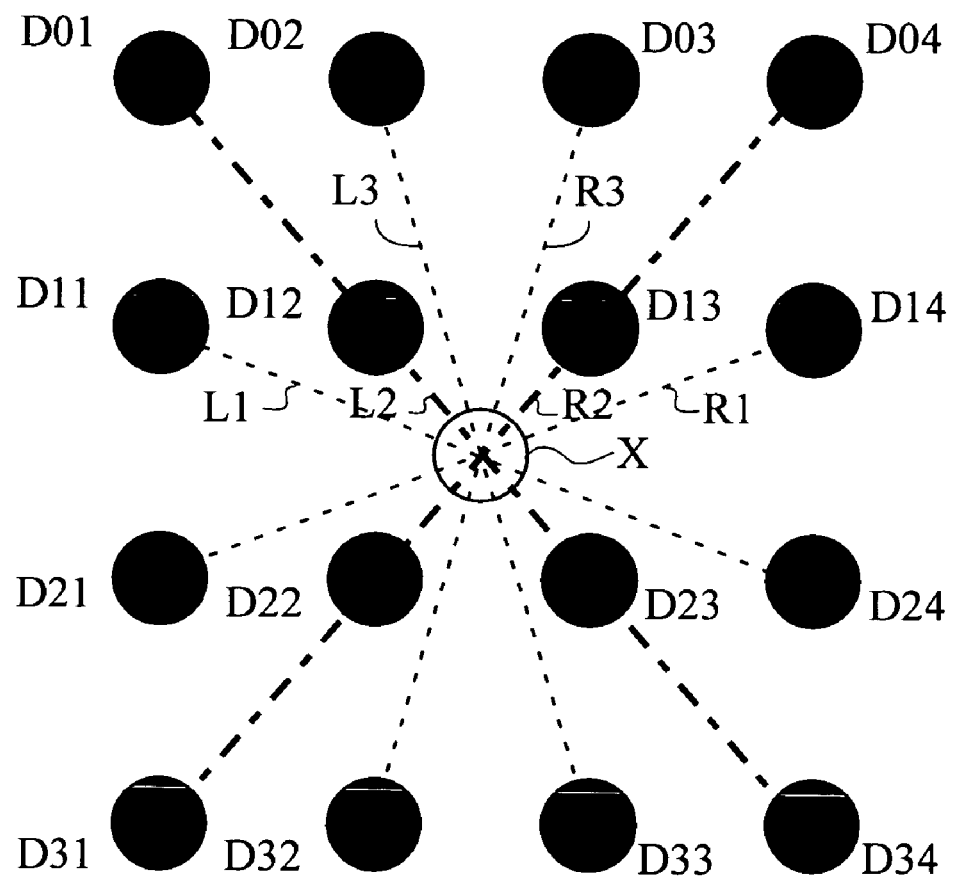
FIG. 18 is a schematic view showing the relationship between original pixels and an interpolated pixel.

FIG. 18 illustrates the relationship between original pixels and a pixel to be interpolated.

In the third image interpolating method, a pixel is interpolated at a central position among four original pixels D12, D13, D22, and D23, as shown in FIG. 18.

Description is now made of a method of finding pixel data on an interpolated pixel X arranged at the central position among the four original pixels D12, D13, D22, and D23.

Pixel data on original pixels D01 to D04, D11 to D14, D21 to D24, and D31 to D34 and the pixel data on the interpolated pixel X are respectively denoted by d01 to d04, d11 to d14, d21 to d24, and d31 to d34 and x.

Figure 19:
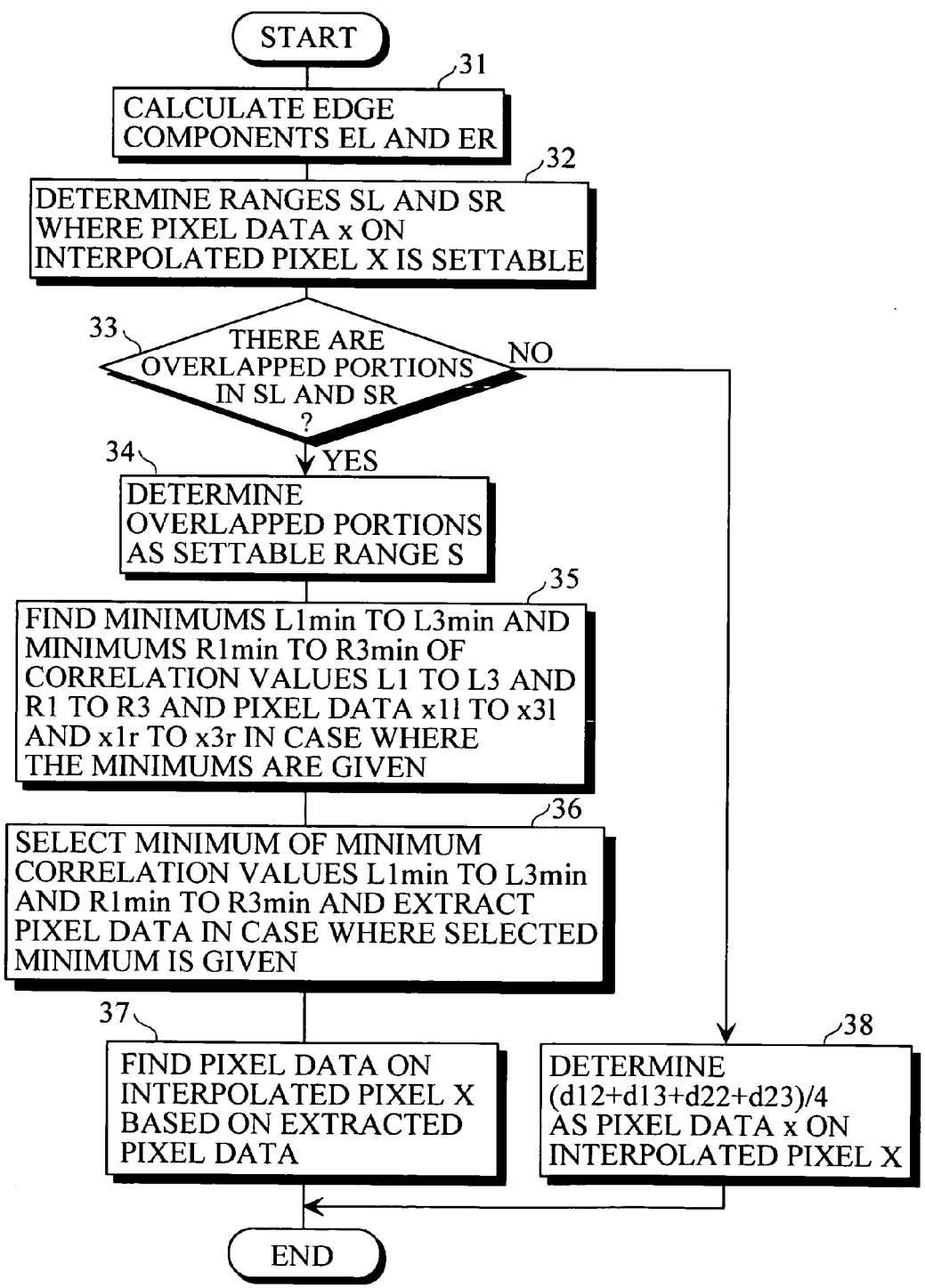
FIG. 19 is a flow chart showing the procedure for a third image interpolating method.

FIG. 19 shows the procedure for image interpolation processing by the third image interpolating method.

First, two types of edge components EL and ER are calculated in order to judge whether or not the interpolated pixel X exists in the vicinity of an edge of an original image (step 31). That is, the edge component EL is calculated on the basis of the following equation (88) using the pixel data on the original pixels D01, D12, D23, and D34, and the edge component ER is calculated on the basis of the following equation (89) using the pixel data on the original pixels D04, D13, D22, and D31:

$$EL = -d01 + d12 + d23 - d34 \quad (88)$$

$$ER = -d04 + d13 + d23 - d31 \quad (89)$$

Ranges SL and SR where the pixel data x on the interpolated pixel X is settable are then determined for the edge components EL and ER (step 32).

That is, the range SL where the pixel data x on the interpolated pixel X is settable is found on the basis of the edge component EL, and the range SR where the pixel data x on the interpolated pixel X is settable is found on the basis of the edge component ER, as at the step 2 shown in FIG. 2.

Specifically, letting Th be a predetermined threshold, $dL_{max}$ be the larger one of the pixel data d12 on the original pixel D12 and the pixel data d23 on the original pixel D23, $dL_{min}$ be the smaller one of the pixel data d12 and d23, and dL be $dL_{max} - dL_{min}$, the settable range SL is found on the basis of the following expression (90):

if $EL > Th$, then $dL_{min} + dL/2 \leq SL \leq dL_{max}$, if $-Th \leq EL \leq Th$, then $dL_{min} + dL/4 \leq SL \leq dL_{max} - dL/4$, and if $E < -Th$, then $dL_{min} \leq SL \leq dL_{min} + dL/2$, (90)

Letting $dR_{max}$ be the larger one of the pixel data d13 on the original pixel D13 and the pixel data d22 on the original pixel D22, $dR_{min}$ be the smaller one of the pixel data d13 and d22, and dR be $dR_{max} - dR_{min}$ the settable range SR is found on the basis of the following expression (91):

if $ER > Th$, then $dR_{min} + dR/2 \leq SR \leq dR_{max}$, if $-Th \leq ER \leq Th$, then $dR_{min} + dR/4 \leq SR \leq dR_{max} - dR/4$, and if $E < -Th$, then $dR_{min} \leq SR \leq dR_{min} + dR/2$, (91)

It is then judged whether or not there exist portions which are overlapped with each other in both the settable ranges SL and SR (step 33).

Figure 20A:
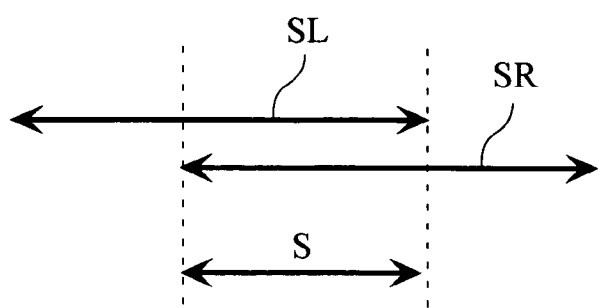
FIGS. 20(*a*) and 20(*b*) are schematic views showing the relationship between a first settable range SL and a second settable range SR.

When there are portions which are overlapped with each other in both the settable ranges SL and SR, as shown in FIG. 20(a), the overlapped portions are taken as a range S where the pixel data x on the interpolated pixel X is settable (step 34).

Candidates for the pixel data on the interpolated pixel X are found from the range where the pixel data x on the interpolated pixel X is settable on the basis of pixel data on opposed pixels between which the interpolated pixel X is sandwiched diagonally (step 35).

On the basis of the following equations (92) to (97) respectively expressing a correlation value L1 between the pixel data on the original pixels D11 and D24 and the pixel data on the interpolated pixel X, a correlation value L2 between the pixel data on the original pixels D12 and D23 and the pixel data on the interpolated pixel X, a correlation value L3 between the pixel data on the original pixels D02 and D33 and the pixel data on the interpolated pixel X, a correlation value R1 between the pixel data on the original pixels D14 and D21 and the pixel data on the interpolated pixel X, a correlation value R2 between the pixel data on the original pixels D13 and D22 and the pixel data on the interpolated pixel X, and a correlation value R3 between the pixel data on the original pixels D03 and D32 and the pixel data on the interpolated pixel X, the respective minimums $L1_{min}$ to $L3_{min}$ and $R1_{min}$ to $R3_{min}$ of the correlation values L1 to L3 and R1 to R3 and pixel data x1l to x3l and x1r to x3r in a case where the minimums are respectively given are found in the same method as the second method at the step 3 shown in FIG. 2:

$$L1 = |d11 - x| + |d24 - x| \quad (92)$$

$$L2 = |d12 - x| + |d23 - x| \quad (93)$$

$$L3 = |d01 - x| + |d33 - x| \quad (94)$$

$$R1 = |d14 - x| + |d21 - x| \quad (95)$$

$$R2 = |d13 - x| + |d22 - x| \quad (96)$$

$$R3 = |d03 - x| + |d32 - x| \quad (97)$$

The minimum correlation value which is the minimum of the minimum correlation values $L1_{min}$ to $L3_{min}$ and $R1_{min}$ to $R3_{min}$ thus found is selected, and the pixel data corresponding to the selected minimum correlation value is extracted from the pixel data x1l to x3l and x1r to x3r (step 36).

The pixel data x on the interpolated pixel X is found on the basis of the pixel data extracted at the step 36 (step 37).

That is, the pixel data and the pixel data which are respectively the maximum and the minimum are extracted from the pixel data extracted at the step 36, and the average of the two pixel data is then calculated. The result of the calculation is taken as the pixel data x on the interpolated pixel X When the number of the pixel data selected at the step 36 is one, the pixel data is determined as the pixel data x on the interpolated pixel X.

The average of the pixel data extracted at the step 36 may be calculated, to determine the result of the calculation as the pixel data x on the interpolated pixel X.

Pixel data obtained from opposed pixels in closest proximity to the interpolated pixel X may be extracted from the pixel data selected at the step 36, to take the extracted pixel data as the pixel data x on the interpolated pixel X. In this case, when there are two pixel data obtained from the set of opposed pixels in closest proximity to the interpolated pixel X, the average of the pixel data is taken as the pixel data x on the interpolated pixel X.

Figure 20B:
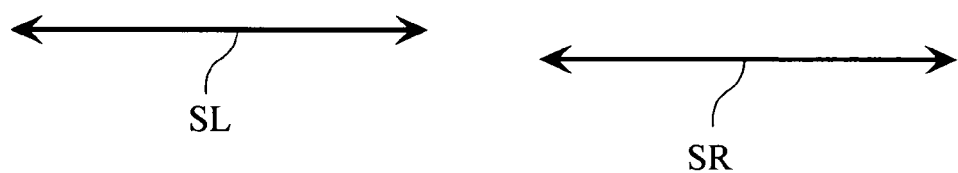

When it is judged at the foregoing step 33 that the settable ranges SL and SR respectively found by the edge components EL and the ER are not overlapped with each other, as shown in FIG. 20(b), the average (d12+d13+d22+d23)/4 of the pixel data d12, d13, d22, and d23 on the four original pixels D12, D13, D22, and D23 is determined as the pixel data x on the interpolated pixel X (step 38).

When image interpolation is performed using the third image interpolating method in the image interpolating device configured as shown in FIGS. 7 and 8, the correlation value operating unit 2 may be caused to perform the processing at the steps 31 to 35 and the step 38 shown in FIG. 19.

That is, the correlation value operating unit 2 first finds the edge components EL and ER, and finds the settable ranges SL and SR for the found edge components EL and ER. When there are portions which are overlapped with each other in the settable ranges SL and SR, the minimum correlation values $L1_{min}$ to $L3_{min}$ and $R1_{min}$ to $R3_{min}$ and the pixel data x1*l* to x3*l* and x1*r* to x3*r* in a case where the minimum correlation values are respectively given are thus found. The found minimum correlation values $L1_{min}$ to $L3_{min}$ and $R1_{min}$ to $R3_{min}$ are fed to the minimum extracting unit 3, and the pixel data x1*l* to x3*l* and x1*r* to x3*r* are fed to the pixel data selecting unit 4.

On the other hand, when the settable ranges SL and SR found by the edge components E1 and ER are not overlapped with each other, the average of the pixel data on the four pixels D12, D13, D22, and D23 is outputted to the output terminal OUT as the pixel data x on the interpolated pixel X.

Although in the above-mentioned example, the pixel data on the interpolated pixel is found using six sets of opposed pixels, the number of sets of opposed pixels is not limited to six. The pixel data on the interpolated pixel may be found using more sets of opposed pixels.

[4] Description of Fourth Image Interpolating Method

Description is now made of a fourth image interpolating method.

In the fourth image interpolating method, a pixel is interpolated at a central position among four original pixels D12, D13, D22, and D23, as shown in FIG. 18, as in the third image interpolating method. However, the fourth image interpolating method slightly differs from the third image interpolating method.

Description is now made of a method of finding pixel data on an interpolated pixel arranged at the central position among the fourth original pixels D12, D13, and D22, and D23.

Pixel data on original pixels D01 to D04, D11 to D14, D21 to D24, and D31 to D34 and the pixel data on the interpolated pixel X are respectively denoted by d01 to d04, d11 to d14, d21 to d24, and d31 to d34 and x.

Figure 21:
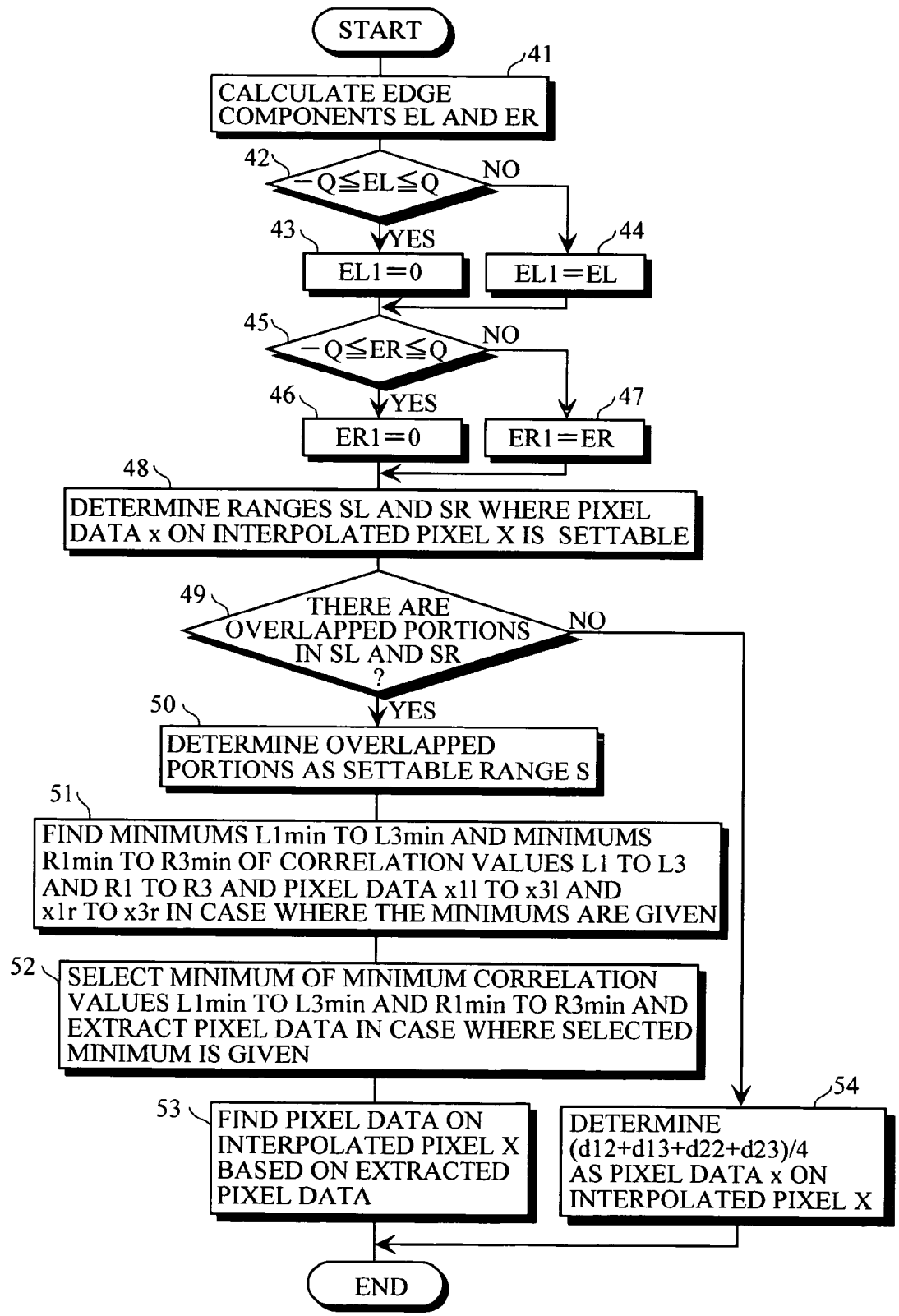
FIG. 21 is a flow chart showing the procedure for a fourth image interpolating method.

FIG. 21 shows the procedure for image interpolation processing by the fourth image interpolating method.

First, two types of edge components EL and ER are calculated in order to judge whether or not the interpolated pixel X exists in the vicinity of an edge of an original image (step 41). That is, the edge component EL is calculated on the basis of the following equation (98) using the pixel data on the original pixels D01, D12, D23, and D34, and the edge component ER is calculated on the basis of the following equation (99) using the pixel data on the original pixels D04, D13, D22, and D31:

$$EL=-d01+d12+d23-d34 \quad (98)$$

$$ER=-d04+d13+d22-d31 \quad (99)$$

Correction processing is then performed with respect to the edge component EL. That is, it is judged whether or not the edge component EL is within a range of $-Q \leq EL \leq Q$ letting N be a pseudo noise component previously set (step 42).

The edge component EL is corrected on the basis of the result of the judgment. That is, letting EL1 be an edge component after the correction, the edge component EL1 after the correction is set to zero when the edge component EL is within the range of $-Q \leq EL \leq Q$ (step 43).

When the edge component ER is outside the range of $-Q\ EL \leq Q$, that is, EL<-Q or EL>Q, the edge component E1 after the correction is taken as EL (step 44).

Similar correction processing is then also performed with respect to the edge component ER. That is, it is judged whether or not the edge component ER is within the range of $-Q \leq ER \leq Q$, letting N be a pseudo noise component previously set (step 45).

The edge component ER is corrected on the basis of the result of the judgment. That is, letting ER1 be an edge component after the correction, the edge component ER1 after the correction is set to zero when the edge component EL is within the range of $-Q \leq ER \leq Q$ (step 46).

When the edge component ER is outside the range of $-Q \leq ER \leq Q$, that is, ER<-Q or ER>Q, the edge component ER1 after the correction is taken as ER (step 47).

A range SL where the pixel data x on the interpolated pixel X is settable is then determined on the basis of EL1 after the correction, and a range SR where the pixel data x on the interpolated pixel X is settable is then determined on the basis of ER1 after the correction (step 48). A method of finding the settable ranges SL and SR is the same as that at the step 15 shown in FIG. 10.

Specifically, letting $dL_{max}$ be the larger one of the pixel data d12 on the original pixel D12 and the pixel data d23 on the original pixel D23, $dL_{min}$ be the smaller one of them, dLc be the average of $dL_{max}$ and $dL_{min}$, and α and γ be previously set factors, the settable range SL is found on the basis of the following expression (100):

if $EL1 \geq 0$, then $dL_{min} \cdot \alpha + dLc(1-\alpha) \leq SL \leq dL_{max} \times \alpha + dLc(1-\alpha) + EL1 \cdot \gamma$, and if $EL1<0$, then $dL_{min} \cdot \alpha + dLc(1-\alpha) + EL1 \cdot \gamma \leq SL \leq dL_{max} \cdot \alpha + dLc(1-\alpha)$ (100)

Letting $dR_{max}$ be the larger one of the pixel data d13 on the original pixel D13 and the pixel data d22 on the original pixel D22, $dR_{min}$ be the smaller one of them, dRc be the average of $dR_{max}$ and $dR_{min}$, and α and γ be previously set factors, the settable range SR is found on the basis of the following expressions (101):

if $ER1 \geq 0$, then $dR_{min} \cdot \alpha + dRc(1-\alpha) \leq SR \leq dR_{max} \cdot \alpha + dRc(1-\alpha) + ER1 \cdot \gamma$, and if $ER1 < 0$, then $dR_{min} \cdot \alpha + dRc(1-\alpha) + ER1 \cdot \gamma \leq SR \leq dR_{max} \cdot \alpha + dRc(1-\alpha)$ (101)

It is then judged whether or not there are portions which are overlapped with each other in both the settable ranges SL and SR (step 49).

When there are portions which are overlapped with each other in both the settable ranges SL and SR, the overlapped portions are taken as a range S where the pixel data x on the interpolated pixel X is settable (step 50).

Candidates for the pixel data on the interpolated pixel X are found from the range where the pixel data x on the interpolated pixel X is settable on the basis of pixel data on opposed pixels between which the interpolated pixel X is sandwiched diagonally (step 51).

On the basis of the following equations (102) to (107) respectively expressing a correlation value L1 between the pixel data on the original pixels D1 and D24 and the pixel data on the interpolated pixel X, a correlation value L2 between the pixel data on the original pixels D12 and D23 and the pixel data on the interpolated pixel X, a correlation value L3 between the pixel data on the original pixels D02 and D33 and the pixel data on the interpolated pixel X, a correlation value R1 between the pixel data on the original pixels D14 and D21 and the pixel data on the interpolated pixel X, a correlation value R2 between the pixel data on the original pixels D13 and D22 and the pixel data on the interpolated pixel X, and a correlation value R3 between the pixel data on the original pixels D03 and D32 and the pixel data on the interpolated pixel X, the respective minimums $L1_{min}$ to $L3_{min}$ and $R1_{min}$ to $R3_{min}$ of the correlation values L1 to L3 and R1 to R3 and pixel data x11 to x31 and x1r to x3r in a case where the minimums are respectively given are found in the same method as the second method at the step 3 shown in FIG. 2:

$L1 = |d11-x| + |d24-x|$ (102)

$L2 = |d12-x| + |d23-x|$ (103)

$L3 = |d01-x| + |d33-x|$ (104)

$R1 = |d14-x| + |d21-x|$ (105)

$R2 = |d13-x| + |d22-x|$ (106)

$R3 = |d03-x| + |d32-x|$ (106)

The minimum correlation value which is the minimum of the minimum correlation values $L1_{min}$ to $L3_{min}$ and $R1_{min}$ to $R3_{min}$ thus found is selected, and the pixel data corresponding to the selected minimum correlation value is extracted from the pixel data x11 to x31 and x1r to x3r (step 52).

The pixel data x on the interpolated pixel X is found on the basis of the pixel data extracted at the step 52 (step 53).

That is, the pixel data and the pixel data which are respectively the maximum and the minimum are extracted from the pixel data extracted at the step 52, and the average of the two pixel data is then calculated. The result of the calculation is taken as the pixel data x on the interpolated pixel X. When the number of pixel data extracted at the step 52 is one, the pixel data is determined as the pixel data x on the interpolated pixel X.

The average of the pixel data extracted at the step 52 may be calculated, to determine the result of the calculation as the pixel data x on the interpolated pixel X.

Pixel data obtained from opposed pixels in closest proximity to the interpolated pixel X may be extracted from the pixel data selected at the step 52, to take the extracted pixel data as the pixel data x on the interpolated pixel X. In this case, when there are two pixel data obtained from the set of opposed pixels in closest proximity to the interpolated pixel X, the average of the pixel data is taken as the pixel data x on the interpolated pixel X.

When it is judged at the foregoing step 49 that the settable ranges SL and SR respectively found by the edge components EL1 and ER1 are not overlapped with each other, the average $(d12+d13+d22+d23)/4$ of the pixel data d12, d13, d22, and d23 on the four original pixels D12, D13, D22, and D23 is determined as the pixel data x on the interpolated pixel X (step 54).

When image interpolation is performed using the fourth image interpolating method in the image interpolating device configured as shown in FIG. 7 or 8, the correlation value operating unit 2 may be caused to perform the processing at the steps 41 to 51 and the step 54 shown in FIG. 21.

The invention claimed is:

1. In an image comprising pixels arranged in columns and rows, an interpolating method for interpolating a pixel at an intermediate position between a first original pixel, having pixel data d1, and a second original pixel, having pixel data d2, adjacent to the first original pixel, the image interpolating method by comprising:

a first step of calculating an edge component E for judging whether or not an interpolated pixel exists in the vicinity of an edge position of original image data, the edge component E calculated according to the equation $E = -d3 + d1 + d2 - d4$, wherein d3 is pixel data for a third original pixel adjacent to the first original pixel, d4 is pixel data for a fourth original pixel adjacent to the second original pixel, and wherein the first, second, third and fourth original pixels are arranged in a column;

a second step of finding a range where pixel data on the interpolated pixel is settable on the basis of the calculated edge component and pixel data on the first and second original pixels;

a third step of selecting a plurality of sets of opposed pixels between which the interpolated pixel is sandwiched diagonally, and finding, for each of the sets, the pixel data on the interpolated pixel in a case where a correlation value represented by the sum of the absolute values of the differences between the pixel data on the interpolated pixel and pixel data on the opposed pixels is the minimum in the range where the pixel data on the interpolated pixel is settable and the minimum correlation value; and a fourth step of finding the pixel data on the interpolated pixel on the basis of the pixel data on the interpolated pixel in the case where the correlation value is the minimum and the minimum correlation value which are found for each of the sets.

2. The image interpolating method according to claim 1, characterized in that letting Th be a predetermined threshold, $d_{max}$ be the larger one of the pixel data on the first original pixel and the pixel data on the second original pixel, $d_{min}$ be the smaller one of them, and d be $d_{max}-d_{min}$, a range S where the pixel data on the interpolated pixel is settable is found on the basis of the following expression at the second step:

if $E>Th$, then $d_{min}+d/2 \leq S > d_{max}$, if $-Th \leq E \leq Th$, then $d_{min}+d/4 < S < d_{max}-d/4$, and if $E<-Th$, then $d_{min} \leq S \leq d_{min}+d/2$.

3. The image interpolating method according to claim 1, characterized in that letting x be the pixel data in the settable range S found at the second step, and da and db be respectively the pixel data on the two original pixels composing one set of opposed pixels, a correlation value L corresponding to the set is calculated by $L=|da-x|+|db-x|$.

4. The image interpolating method according to claim 1, characterized in that the fourth step comprises the steps of
   selecting the minimum of the minimum correlation values found for the sets at the third step,
   extracting the pixel data on the interpolated pixel in a case where the selected minimum of the minimum correlation values is given,
   determining, when the number of minimums of the minimum correlation values is one, the pixel data on the interpolated pixel in a case where the minimum of the minimum correlation values is given as the pixel data on the interpolated pixel, and
   determining, when there are a plurality of minimums of the minimum correlation values, the average of the pixel data on the interpolated pixel in a case where the minimums of the minimum correlation values are respectively given as the pixel data on the interpolated pixel.

5. The image interpolating method according to claim 1, characterized in that the fourth step comprises the steps of
   selecting the minimum of the minimum correlation values found for the sets at the third step,
   extracting the pixel data on the interpolated pixel in a case where the selected minimum of the minimum correlation values is given,
   determining, when the number of minimums of the minimum correlation values is one, the pixel data on the interpolated pixel in a case where the minimum of the minimum correlation values is given as the pixel data on the interpolated pixel, and
   extracting, when there are a plurality of minimums of the minimum correlation values, the maximum and the minimum of the pixel data on the interpolated pixel in a case where the minimums of the minimum correlation values are respectively given, and determining the average of the extracted maximum and minimum as the pixel data on the interpolated pixel.

6. The image interpolating method according to claim 1, characterized in that the fourth step comprises the steps of
   selecting the minimum of the minimum correlation values found for the sets at the third step,
   extracting the pixel data on the interpolated pixel in a case where the selected minimum of the minimum correlation values is given,
   determining, when the number of minimums of the minimum correlation values is one, the pixel data on the interpolated pixel in a case where the minimum of the minimum correlation values is given as the pixel data on the interpolated pixel, and
   selecting, when there are a plurality of minimums of the minimum correlation values, the pixel data obtained from opposed pixels in closest proximity to the interpolated pixel out of the pixel data on the interpolated pixel in a case where the minimums of the minimum correlation values are respectively given, and determining, when the number of the selected pixel data is one, the pixel data as the pixel data on the interpolated pixel, while determining, when the number of the selected pixel data is two, the average of the pixel data as the pixel data on the interpolated pixel.

7. In an image comprising pixels arranged in columns and rows, an interpolating method for interpolating a pixel at an intermediate position between a first original pixel, having pixel data d1, and a second original pixel, having pixel data d2, adjacent to the first original pixel, the image interpolating method comprising:
   a first step of calculating an edge component E for judging whether or not an interpolated pixel exists in the vicinity of an edge position of original image data, the edge component E calculated according to the equation $E=-d3+d1+d2-d4$, wherein d3 is pixel data for a third original pixel adjacent to the first original pixel, d4 is pixel data for a fourth original pixel adjacent to the second original pixel, and wherein the first, second, third and fourth original pixels are arranged in a column;
   a second step of correcting the calculated edge component E on the basis of a predetermined pseudo noise component;
   a third step of finding a range where pixel data on the interpolated pixel is settable on the basis of an edge component after the correction and pixel data on the first and second original pixels;
   a fourth step of selecting a plurality of sets of opposed pixels between which the interpolated pixel is sandwiched diagonally, and finding, for each of the sets, the pixel data on the interpolated pixel in a case where a correlation value represented by the sum of the absolute values of the differences between the pixel data on the interpolated pixel and pixel data on original pixels in the vicinity of the opposed pixels is the minimum in the range where the pixel data on the interpolated pixel is settable and the minimum correlation value; and
   a fifth step of finding the pixel data on the interpolated pixel on the basis of the pixel data on the interpolated pixel in the case where the correlation value is the minimum and the minimum correlation value which are found for each of the sets.

8. The image interpolating method according to claim 7, characterized in that letting Q be a pseudo noise component, an edge component E1 after the correction found at the second step is given by the following expression:

if $-Q \leq E \leq Q$, then $E1=0$, and if $E>Q$ or $E<-Q$, then $E1=E$.

9. The image interpolating method according to claim 8, characterized in that letting E1 be the edge component after the correction found at the second step, $d_{max}$ be the larger one of the pixel data on the first original pixel and the pixel data on the second original pixel, $d_{min}$ be the smaller one of them, dc be the average of $d_{max}$ and $d_{min}$, and $\alpha(0 \leq \alpha \leq 1)$ and γ be previously set factors, a range S where the pixel data on the interpolated pixel is settable is found on the basis of the following expression at the third step:

if $E1 \geq 0$, then $d_{min} \cdot \alpha + dc(1-\alpha) \leq S \leq d_{max} \cdot \alpha + dc(1-\alpha) + E1 \cdot \gamma$, and If $E1<0$, then $d_{min} \cdot \alpha + dc(1-\alpha) + E1 \cdot \gamma \leq S \leq d_{max} \cdot \alpha + dc(1-\alpha)$.

10. The image interpolating method according to claim 7, characterized in that
when a direction connecting the first original pixel and the second original pixel is defined as a vertical direction, a direction perpendicular to the vertical direction is defined as a right-and-left direction, a set of opposed pixels is taken as D12 and D24, two original pixels adjacent to the one opposed pixel D12 on the right and left sides are taken as D11 and D13, two original pixels adjacent to the opposed pixel D12 on the upper and lower sides are taken as D02 and D22, two original pixels adjacent to the other opposed pixel D24 on the right and left sides are taken as D23 and D25, two original pixels adjacent to the opposed pixel D24 on the upper and lower sides are taken as D14 and D34, pixel data on the original pixels D02, D11, D12, D13, D14, D22, D23, D24, D25, and D34 are respectively taken as d02, d11, d12, d13, d14, d22, d23, d24, d25, and d34, $\beta 1$ and $\beta 2$ are taken as predetermined factors, and the pixel data in the settable range S found at the third step is taken as x, an equation for calculating the correlation value L corresponding to the set is expressed by the following equations:

$L=|d12-x|+|d24-x|+\beta 1 \cdot H1-\beta 2 \cdot V1$ $H1=\text{MAX }\{(|d1-d12|+|d12-d13|), (d23-d24|+|d24-d25|)\}$ $V1=\text{MIN }\{(|d02-d12|+|d12-d22|),(|d14-d24|+|d24-d34|)\}$ 11. The image interpolating method according to claim 7, characterized in that the fifth step comprises the steps of
selecting the minimum of the minimum correlation values found for the sets at the fourth step,
extracting the pixel data on the interpolated pixel in a case where the selected minimum of the minimum correlation values is given,
determining, when the number of minimums of the minimum correlation values is one, the pixel data on the interpolated pixel in a case where the minimum of the minimum correlation values is given as the pixel data on the interpolated pixel, and
determining, when there are a plurality of minimums of the minimum correlation values, the average of the pixel data on the interpolated pixel in a case where the minimums of the minimum correlation values are respectively given as the pixel data on the interpolated pixel.

12. The image interpolating method according to claim 7, characterized in that the fifth step comprises the steps of
selecting the minimum of the minimum correlation values found for the sets at the fourth step,
extracting the pixel data on the interpolated pixel in a case where the selected minimum of the minimum correlation values is given,
determining, when the number of minimums of the minimum correlation values is one, the pixel data on the interpolated pixel in a case where the minimum of the minimum correlation values is given as the pixel data on the interpolated pixel, and
extracting, when there are a plurality of minimums of the minimum correlation values, the maximum and the minimum of the pixel data on the interpolated pixel in a case where the minimums of the minimum correlation values are respectively given, and determining the average of the extracted maximum and minimum as the pixel data on the interpolated pixel.

13. The image interpolating method according to claim 7, characterized in that the fifth step comprises the steps of
selecting the minimum of the minimum correlation values found for the sets at the fourth step,
extracting the pixel data on the interpolated pixel in a case where the selected minimum of the minimum correlation values is given;
determining, when the number of minimums of the minimum correlation values is one, the pixel data on the interpolated pixel in a case where the minimum of the minimum correlation values is given as the pixel data on the interpolated pixel, and
selecting, when there are a plurality of minimums of the minimum correlation values, the pixel data obtained from opposed pixels in closest proximity to the interpolated pixel out of the pixel data on the interpolated pixel in a case where the minimums of the minimum correlation values are respectively given, and determining, when the number of the selected pixel data is one, the pixel data as the pixel data on the interpolated pixel, while determining, when the number of the selected pixel data is two, the average of the pixel data as the pixel data on the interpolated pixel.

14. In an image interpolating method for interpolating a pixel at a central position among four original pixels comprising a first original pixel and a second original pixel which are adjacent to each other on the right and left sides, a third pixel adjacent to the first original pixel on the lower side, and a fourth pixel adjacent to the second original pixel on the lower side, the image interpolating method is comprising:
a first step of calculating a first edge component EL for judging whether or not an interpolated pixel exists in the vicinity of an edge position of original image data on the basis of pixel data on the first original pixel, the fourth original pixel, a fifth original pixel on an extension of a line connecting the first original pixel and the fourth original pixel and adjacent to the first original pixel diagonally to the upper left, and a sixth original pixel on the extension of the line connecting the first original pixel and the fourth original pixel and adjacent to the fourth original pixel diagonally to the lower right;
a second step of calculating a second edge component ER for judging whether or not the interpolated pixel exists in the vicinity of the edge position of the original image data on the basis of pixel data on the second original pixel, the third original pixel, a seventh original pixel on an extension of a line connecting the second original pixel and the third original pixel and adjacent to the second original pixel diagonally to the upper right, and an eighth original pixel on the extension of the line connecting the second original pixel and the third original pixel and adjacent to the third original pixel diagonally to the lower left;
a third step of finding a first range where pixel data on the interpolated pixel is settable on the basis of the first edge component and the pixel data on the first and fourth original pixels and a second range where the pixel data on the interpolated pixel is settable on the basis of the second edge component and the pixel data on the second and third original pixels;
a fourth step of judging whether or not portions which are overlapped with each other exist in the first settable range and the second settable range;
a fifth step of calculating, when there exist no portions which are overlapped with each other in the first settable range and the second settable range, the average of the pixel data on the first to fourth original pixels, and determining the result of the calculation as the pixel data on the interpolated pixel;

a sixth step of setting, when there exist portions which are overlapped with each other in the first settable range and the second settable range, the overlapped portions as a settable range, then selecting a plurality of sets of opposed pixels between which the interpolated pixel is sandwiched diagonally, and finding, for each of the sets, the pixel data on the interpolated pixel in a case where a correlation value represented by the sum of the absolute values of the differences between the pixel data on the interpolated pixel and pixel data on the opposed pixels is the minimum in the range where the pixel data on the interpolated pixel is settable and the minimum correlation value; and a seventh step of finding the pixel data on the interpolated pixel on the basis of the pixel data on the interpolated pixel in the case where the correlation value is the minimum and the minimum correlation value which are found for each of the sets at said sixth step, wherein if d1 is pixel data for the first original pixel, d4 is pixel data for the fourth original pixel, d5 is pixel data for the fifth original pixel, d6 is pixel data for the sixth original pixel, the first edge component EL is calculated according to an equation EL=−d5+d1+d4−d6 at the first step, and wherein if d2 is pixel data for the second original pixel, d3 is pixel data for the third original pixel, d7 is pixel data for the seventh original pixel, d8 is pixel data for the eighth original pixel, the second edge component ER is calculated according to an equation ER=−d7+d2+d3−d8 at the second step.

15. The image interpolating method according to claim 14, characterized in that letting Th be a predetermined threshold, $dL_{max}$ be the larger one of the pixel data on the first original pixel and the pixel data on the fourth original pixel, $dL_{min}$ be the smaller one of them, dL be $dL_{max}-dL_{min}$, $dR_{max}$ be the larger one of the pixel data on the second original pixel and the pixel data on the third original pixel, $dR_{min}$ be the smaller one of them, and dR be $dR_{max}-dR_{min}$, a first settable range SL and a second settable range SR are found on the basis of the following expressions at the third step:

if $EL>Th$, then $dL_{min}+dL/2 \leq SL \leq dL_{max}$, if $-Th \leq EL \leq Th$, then $dL_{min}+dL/4 \leq SL \leq dL_{max}-dL/4$, and if $EL<-Th$, then $dL_{min}<SL<dL_{min}+dL/2$ if $ER>Th$, then $dR_{min}+dR/2 \leq SR \leq dR_{max}$, if $-Th \leq ER \leq Th$, then $dR_{min}+dR/4 \leq SR \leq dR_{max}-dR/4$, and if $ER<-Th$, then $dR_{min} \leq SR \leq dR_{min}+dR/2$.

16. The image interpolating method according to claim 14, characterized in that letting x be the pixel data in the settable range S set at the sixth step, and da and db be respectively the pixel data on the two original pixels composing one set of opposed pixels, a correlation value L corresponding to the set is calculated by L=|da−x|+|db−x|.

17. The image interpolating method according to claim 14, characterized in that the seventh step comprises the steps of selecting the minimum of the minimum correlation values found for the sets at the sixth step, extracting the pixel data on the interpolated pixel in a case where the selected minimum of the minimum correlation values is given;

determining, when the number of minimums of the minimum correlation values is one, the pixel data on the interpolated pixel in a case where the minimum of the minimum correlation values is given as the pixel data on the interpolated pixel, and determining, when there are a plurality of minimums of the minimum correlation values, the average of the pixel data on the interpolated pixel in a case where the minimums of the minimum correlation values are respectively given as the pixel data on the interpolated pixel.

18. The image interpolating method according to claim 14, characterized in that the seventh step comprises the steps of selecting the minimum of the minimum correlation values found for the sets at the sixth step, extracting the pixel data on the interpolated pixel in a case where the selected minimum of the minimum correlation values is given, determining, when the number of minimums of the minimum correlation values is one, the pixel data on the interpolated pixel in a case where the minimum of the minimum correlation values is given as the pixel data on the interpolated pixel, and extracting, when there are a plurality of minimums of the minimum correlation values, the maximum and the minimum of the pixel data on the interpolated pixel in a case where the minimums of the minimum correlation values are respectively given, and determining the average of the extracted maximum and minimum as the pixel data on the interpolated pixel.

19. The image interpolating method according to claim 14, characterized in that the seventh step comprises the steps of selecting the minimum of the minimum correlation values found for the sets at the sixth step, extracting the pixel data on the interpolated pixel in a case where the selected minimum of the minimum correlation values is given, determining, when the number of minimums of the minimum correlation values is one, the pixel data on the interpolated pixel in a case where the minimum of the minimum correlation values is given as the pixel data on the interpolated pixel, and selecting, when there are a plurality of minimums of the minimum correlation values, the pixel data obtained from opposed pixels in closest proximity to the interpolated pixel out of the pixel data on the interpolated pixel in a case where the minimums of the minimum correlation values are respectively given, and determining, when the number of the selected pixel data is one, the pixel data as the pixel data on the interpolated pixel, while determining, when the number of the selected pixel data is two, the average of the pixel data as the pixel data on the interpolated pixel.

20. In an image interpolating method for interpolating a pixel at a central position among four original pixels comprising a first original pixel and a second original pixel which are adjacent to each other on the right and left sides, a third pixel adjacent to the first original pixel on the lower side, and a fourth pixel adjacent to the second original pixel on the lower side, an image interpolating method is characterized by comprising:

a first step of calculating a first edge component EL for judging whether or not an interpolated pixel exists in the vicinity of an edge position of original image data on the basis of pixel data on the first original pixel, the fourth original pixel, a fifth original pixel on an extension of a line connecting the first original pixel and the fourth original pixel and adjacent to the first original pixel diagonally to the upper left, and a sixth original pixel on the extension of the line connecting the first original pixel and the fourth original pixel and adjacent to the fourth original pixel diagonally to the lower right;

a second step of calculating a second edge component ER for judging whether or not the interpolated pixel exists in the vicinity of the edge position of the original image data on the basis of pixel data on the second original pixel, the third original pixel, a seventh original pixel on an extension of a line connecting the second original pixel and the third original pixel and adjacent to the second original pixel diagonally to the upper right, and an eighth original pixel on the extension of the line connecting the second original pixel and the third original pixel and adjacent to the third original pixel diagonally to the lower left;

a third step of respectively correcting the calculated first and second edge components on the basis of predetermined pseudo noise components;

a fourth step of finding a first range where pixel data on the interpolated pixel is settable on the basis of a first edge component after the correction and the pixel data on the first and fourth original pixels and a second range where the pixel data on the interpolated pixel is settable on the basis of a second edge component after the correction and the pixel data on the second and third original pixels;

a fifth step of judging whether or not portions which are overlapped with each other exist in the first settable range and the second settable range;

a sixth step of calculating, when there exist no portions which are overlapped with each other in the first settable range and the second settable range, the average of the pixel data on the first to fourth original pixels, and determining the result of the calculation as the pixel data on the interpolated pixel;

a seventh step of setting, when there exist portions which are overlapped with each other in the first settable range and the second settable range, the overlapped portions as a settable range, then selecting a plurality of sets of opposed pixels between which the interpolated pixel is sandwiched diagonally, and finding, for each of the sets, the pixel data on the interpolated pixel in a case where a correlation value represented by the sum of the absolute values of the differences between the pixel data on the interpolated pixel and pixel data on the opposed pixels and pixel data on original pixels in the vicinity of the opposed pixels is the minimum in the range where the pixel data on the interpolated pixel is settable and the minimum correlation value; and an eighth step of finding the pixel data on the interpolated pixel on the basis of the pixel data on the interpolated pixel in the case where the correlation value is the minimum and the minimum correlation value which are found for each of the sets, wherein if d1 is pixel data for the first original pixel, d4 is pixel data for the fourth original pixel, d5 is pixel data for the fifth original pixel, and d6 is pixel data for the sixth original pixel, the first edge component EL is calculated according to an equation EL=−d5+d1+d4−d6 at the first step, and wherein if d2 is pixel data on the second original pixel, d3 is pixel data on the third original pixel, d7 is pixel data on the seventh original pixel, and d8 is pixel data on the eighth original pixel, the second edge component ER is calculated according to an equation ER=−d7+d2+d3−d8 at the second step.

21. The image interpolating method according to claim 20, characterized in that letting Q be a pseudo noise component, a first edge component EL1 after the correction and a second edge component ER1 after the correction which are found at the third step are given by the following expressions:

if $-Q \leq EL \leq Q$, then $EL1=0$, and if $EL>Q$ or $EL<-Q$, then $EL1=EL$ if $-Q \leq ER \leq Q$, then $ER1=0$, and if $ER>Q$ or $ER<-Q$, then $ER1=ER$.

22. The image interpolating method according to claim 21, characterized in that letting EL1 be the first edge component after the correction, ER1 be the second edge component after the correction, $dL_{max}$ be the larger one of the pixel data on the first original pixel and the pixel data on the fourth original pixel, $dL_{min}$ be the smaller one of them, dLc be the average of $dL_{max}$ and $dL_{min}$, $dR_{max}$ be the larger one of the pixel data on the second original pixel and the pixel data on the third original pixel, $dR_{min}$ be the smaller one of them, dRc be the average of $dR_{max}$ and $dR_{min}$, and α and γ be previously set factors, a first settable range SL and a second settable range SR are found on the basis of the following expressions at the fourth step:

if $EL1 \geq 0$, then $dL_{min} \cdot \alpha + dLc(1-\alpha) \leq SL \leq dL_{max} \cdot \alpha + dLc(1-\alpha) + EL1 \cdot \gamma$, and if $EL1<0$, then $dL_{min} \cdot \alpha + dLc(1-\alpha) + EL1 \cdot \gamma \leq SL \leq dL_{max} \cdot \alpha + dLc(1-\alpha)$ if $ER1 \geq 0$, then $dR_{min} \cdot \alpha + dRc(1-\alpha) \leq SR > dR_{max} \cdot \alpha + dRc(1-\alpha) + ER1 \cdot \gamma$, and if $ER1<0$, then $dR_{min} \cdot \alpha + dRc(1-\alpha) + ER1 \cdot \gamma \leq SR \leq dR_{max} \cdot \alpha + dRc(1-\alpha)$.

23. The image interpolating method according to claim 20, characterized in that letting x be the pixel+data in the settable range S set at the seventh step, and da and db be respectively the pixel data on the two original pixels composing one set of opposed pixels, a correlation value L corresponding to the set is calculated by L=|da−x|+|db−x|.

24. The image interpolating method according to claim 20, characterized in that the eighth step comprises the steps of selecting the minimum of the minimum correlation values found for the sets at the seventh step, extracting the pixel data on the interpolated pixel in a case where the selected minimum of the minimum correlation values is given, determining, when the number of minimums of the minimum correlation values is one, the pixel data on the interpolated pixel in a case where the minimum of the minimum correlation values is given as the pixel data on the interpolated pixel, and determining, when there are a plurality of minimums of the minimum correlation values, the average of the pixel data on the interpolated pixel in a case where the minimums of the minimum correlation values are respectively given as the pixel data on the interpolated pixel.

25. The image interpolating method according to claim 20, characterized in that the eighth step comprises the steps of selecting the minimum of the minimum correlation values found for the sets at the seventh step, extracting the pixel data on the interpolated pixel in a case where the selected minimum of the minimum correlation values is given, determining, when the number of minimums of the minimum correlation values is one, the pixel data on the interpolated pixel in a case where the minimum of the minimum correlation values is given as the pixel data on the interpolated pixel, and extracting, when there are a plurality of minimums of the minimum correlation values, the maximum and the minimum of the pixel data on the interpolated pixel in a case where the minimums of the minimum correlation values are respectively given, and determining the average of the extracted maximum and minimum as the pixel data on the interpolated pixel.

26. The image interpolating method according to claim 20, characterized in that the eighth step comprises the steps of selecting the minimum of the minimum correlation values found for the sets at the seventh step, extracting the pixel data on the interpolated pixel in a case where the selected minimum of the minimum correlation values is given;

determining, when the number of minimums of the minimum correlation values is one, the pixel data on the interpolated pixel in a case where the minimum of the minimum correlation values is given as the pixel data on the interpolated pixel, and selecting, when there are a plurality of minimums of the minimum correlation values, the pixel data obtained from opposed pixels in closest proximity to the interpolated pixel out of the pixel data on the interpolated pixel in a case where the minimums of the minimum correlation values are respectively given, and determining, when the number of the selected pixel data is one, the pixel data as the pixel data on the interpolated pixel, while determining, when the number of the selected pixel data is two, the average of the pixel data as the pixel data on the interpolated pixel.

* * * * *